United States Patent
Matson et al.

(10) Patent No.: US 9,522,975 B2
(45) Date of Patent: Dec. 20, 2016

(54) MERCAPTANIZED VINYLNORBORNENE COMPOSITIONS AND METHODS OF MAKING SAME

(71) Applicant: Chevron Phillips Chemical Company LP, The Woodlands, TX (US)

(72) Inventors: Michael S Matson, Bartlesville, OK (US); Colin Cameron, Stockfield (GB); Alastair R Marrion, Morpeth (GB); Anthony C Wright, Gateshead (GB)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/608,782

(22) Filed: Jan. 29, 2015

(65) Prior Publication Data
US 2016/0222155 A1     Aug. 4, 2016

(51) Int. Cl.
| | |
|---|---|
| *C08G 59/66* | (2006.01) |
| *C08G 75/02* | (2016.01) |
| *C08G 75/04* | (2016.01) |
| *C08G 75/00* | (2006.01) |
| *C09J 181/00* | (2006.01) |
| *C09J 181/02* | (2006.01) |
| *C08L 81/00* | (2006.01) |
| *C08L 81/02* | (2006.01) |

(52) U.S. Cl.
CPC .............. *C08G 59/66* (2013.01); *C08G 75/00* (2013.01); *C08G 75/02* (2013.01); *C08L 81/00* (2013.01); *C08L 81/02* (2013.01); *C09J 181/00* (2013.01); *C09J 181/02* (2013.01)

(58) Field of Classification Search
None
See application file for complete search history.

(56) References Cited

U.S. PATENT DOCUMENTS

| | | | |
|---|---|---|---|
| 3,081,352 A | 3/1963 | Gardner et al. | |
| 3,223,738 A | * 12/1965 | Crain | ............... C07C 319/04 |
| | | | 204/157.76 |
| 3,505,166 A | 4/1970 | Jones et al. | |
| 3,616,374 A | 10/1971 | Goshorn et al. | |
| 3,624,160 A | 11/1971 | Jones et al. | |

(Continued)

FOREIGN PATENT DOCUMENTS

| | | |
|---|---|---|
| EP | 0272181 | 6/1988 |
| GB | 1283832 | 8/1972 |

(Continued)

OTHER PUBLICATIONS

International Search Report and the Written Opinion of the International Searching Authority in PCT/US2016/015258 dated May 13, 2016, 7 pages.

(Continued)

*Primary Examiner* — Joseph D Anthony
(74) *Attorney, Agent, or Firm* — Merchant & Gould P.C.

(57) ABSTRACT

The present invention discloses polythiol compositions containing intermolecular sulfide compounds and at least one of 5-(2-mercapoethyl)norbornane-2-thiol and 5-(2-mercaptoethyl)norbornane-3-thiol. These polythiol compositions can be derived from 5-vinylnorborn-2-ene, and are often used in formulations for adhesives and other end-use applications.

17 Claims, 1 Drawing Sheet

(56) References Cited

U.S. PATENT DOCUMENTS

| | | |
|---|---|---|
| 3,625,925 A | 12/1971 | Oswald et al. |
| 3,940,374 A | 2/1976 | Oswald et al. |
| 4,140,604 A | 2/1979 | Dimmig |
| 4,612,398 A | 9/1986 | Lee |
| 5,374,668 A | 12/1994 | Kanemura et al. |
| 6,447,708 B1 | 9/2002 | Thépot et al. |
| 8,461,293 B2 | 6/2013 | Matson et al. |
| 9,133,370 B2 | 9/2015 | Matson et al. |
| 9,340,715 B2 | 5/2016 | Matson et al. |
| 9,340,716 B2 | 5/2016 | Matson et al. |
| 9,340,717 B2 | 5/2016 | Matson et al. |
| 2004/0181023 A1* | 9/2004 | Yamagishi ............ C07C 323/12 526/319 |
| 2007/0161764 A1* | 7/2007 | Yamagishi ............ C07C 323/12 526/212 |
| 2010/0010267 A1 | 1/2010 | Deck et al. |
| 2012/0035291 A1 | 2/2012 | Matson et al. |
| 2014/0131618 A1 | 5/2014 | Matson |
| 2014/0221692 A1 | 8/2014 | Netemeyer et al. |
| 2015/0344742 A1 | 12/2015 | Matson et al. |
| 2015/0344752 A1 | 12/2015 | Matson et al. |
| 2015/0344756 A1 | 12/2015 | Matson et al. |
| 2016/0040020 A1 | 2/2016 | Matson et al. |
| 2016/0040051 A1 | 2/2016 | Matson et al. |

FOREIGN PATENT DOCUMENTS

| | | |
|---|---|---|
| JP | 9-143151 | 6/1997 |
| WO | WO 2004/101649 | 11/2004 |

OTHER PUBLICATIONS

Zapp et al, entitled "*Radiation-Induced Crosslinking of Chlorobutyl and Polydiene Elastomers. Promotion by Polythiols,*" Rubber Chemistry and Technology, vol. 48, pp. 860-877.

International Search Report, PCT/US2011/046186, dated Dec. 22, 2011, 3 pages.

* cited by examiner

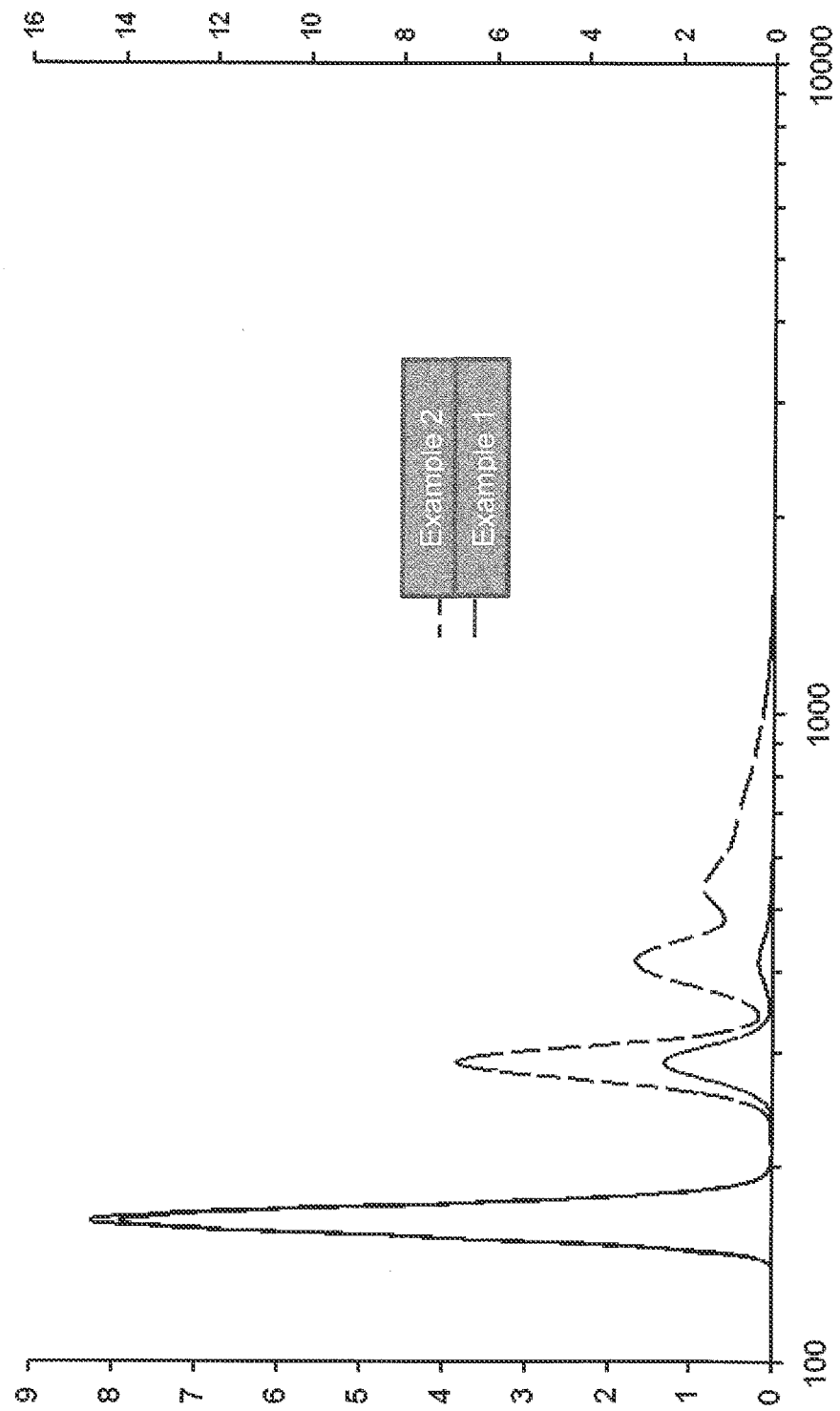

MERCAPTANIZED VINYLNORBORNENE COMPOSITIONS AND METHODS OF MAKING SAME

BACKGROUND OF THE INVENTION

The present invention relates generally to polythiol compositions containing intermolecular sulfide compounds and at least one of 5-(2-mercaptoethyl)norbornane-2-thiol and 5-(2-mercaptoethyl)norbornane-3-thiol, and to methods for producing such polythiol compositions. These polythiol compositions can be used as curing agents in adhesives and other end-use applications.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various polythiol compositions comprising sulfur-containing compounds are disclosed herein. In one embodiment, a polythiol composition comprising sulfur-containing compounds is disclosed, and in this embodiment, the sulfur-containing compounds can comprise (i) 5-(2-mercaptoethyl)norbornane-2-thiol and/or 5-(2-mercaptoethyl)norbornane-3-thiol; and (ii) one or more sulfide molecules having only two thiol sulfur groups (—SH), only one intermolecular sulfide group (—S—), and only two groups independently selected from a 5-(ethyl-2-yl)norborn-2-yl group and a 5-(ethyl-2-yl)norborn-3-yl group.

Another polythiol composition comprising sulfur-containing compounds is provided herein, and in this embodiment, the sulfur-containing compounds can comprise 5-(2-mercaptoethyl)norbornane-2-thiol and/or 5-(2-mercaptoethyl)norbornane-3-thiol, and the sulfur-containing compounds of the polythiol composition can have a weight percentage of intermolecular sulfide compounds that falls within a range from 2 wt. % to 90 wt. %.

In yet another embodiment, a polythiol composition is described herein which can comprise sulfur-containing compounds, and in this embodiment, the sulfur-containing compounds can comprise 5-(2-mercaptoethyl)norbornane-2-thiol and/or 5-(2-mercaptoethyl)norbornane-3-thiol, and the sulfur-containing compounds of the polythiol composition can have an average thiol sulfur (—SH) to sulfide sulfur (—S—) molar ratio that falls within a range from 1.5:1 to 1000:1.

Processes for forming these polythiol compositions also are disclosed herein. Generally, these processes can comprise contacting 5-vinylnorborn-2-ene, $H_2S$, and optionally, a phosphite compound; and forming the polythiol composition. The molar ratio of $H_2S$ to carbon-carbon double bonds of the 5-vinylnorborn-2-ene typically can range from 2:1 to 500:1.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

BRIEF DESCRIPTION OF THE FIGURE

FIG. 1 presents a plot of the molecular weight distributions of the polythiol compositions of Example 1 and Example 2.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects and/or embodiments, a combination of different features can be envisioned. For each and every aspect, and/or embodiment, and/or feature disclosed herein, all combinations that do not detrimentally affect the designs, compositions, processes, and/or methods described herein are contemplated with or without explicit description of the particular combination. Additionally, unless explicitly recited otherwise, any aspect, and/or embodiment, and/or feature disclosed herein can be combined to describe inventive features consistent with the present disclosure.

Regarding claim transitional terms or phrases, the transitional term "comprising," which is synonymous with "including," "containing," "having," or "characterized by," is open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristics of the claimed invention. A "consisting essentially of" claim occupies a middle ground between closed claims that are written in a "consisting of" format and frilly open claims that are drafted in a "comprising" format. Absent an indication to the contrary, describing a composition or method as "consisting essentially of" is not to be construed as "comprising," but is intended to describe the recited element that includes materials or steps which do not significantly alter the composition or method to which the term is applied. For example, a feedstock consisting essentially of material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a reaction mixture consisting of specific components; alternatively, consisting essentially of specific components; or alternatively, comprising the specific components and other non-recited components. While compositions and methods are described herein in terms of "comprising" various components or steps, the compositions and methods can also "consist essentially of" or "consist of" the various components or steps, unless stated otherwise. For example, a polythiol composition consistent with embodiments of the present invention can comprise; alternatively, can consist essentially of; or alternatively, can consist of; (i) 5-(2-mercaptoethyl)norbornane-2-thiol and/or 5-(2-mercaptoethyl)norbornane-3-thiol; and (ii) one or more sulfide molecules having only two thiol sulfur groups, only one intermolecular sulfide group, and only two groups independently selected from a 5-(ethyl-2-yl)norborn-2-yl group and a 5-(ethyl-2-yl)norborn-3-yl group.

The terms "a," "an," and "the" are intended to include plural alternatives, e.g., at least one. For instance, the disclosure of "a solvent," "a phosphite compound," etc., is meant to encompass one, or mixtures or combinations of more than one, solvent, phosphite compound, etc., unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound or group disclosed herein, any name or structure presented is intended to encompass all conformational isomers, regioisomers, stereoisomers, and mixtures thereof that can arise from a particular set of substituents, unless otherwise specified. The name or structure also encompasses all enantiomers, diastereomers, and other optical isomers (if there are any), whether in enantiomeric or racemic forms, as well as mixtures of stereoisomers, as would be recognized by a skilled artisan, unless otherwise specified. For example, a general reference to hexene (or hexenes) includes all linear or branched, acyclic or cyclic, hydrocarbon compounds having six carbon atoms and 1 carbon-carbon double bond; pentane includes n-pentane, 2-methyl-butane, and 2,2-dimethylpropane; a general reference to a butyl group includes an n-butyl group, a sec-butyl group, an iso-butyl group, and a t-butyl group; a general reference to cyclododecatriene includes all isomeric forms (e.g., trans,trans,cis-1,5,9-cyclododecatriene, and trans,trans,trans-1,5,9-cyclododecatriene, among other dodecatrienes); and a general reference to 2,3-pentanediol includes 2R,3R-pentanediol, 2S,3S-pentanediol, 2R,3S-pentanediol, and mixtures thereof.

In one embodiment, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

The term "hydrocarbyl group" is used herein in accordance with the definition specified by IUPAC: a univalent group formed by removing a hydrogen atom from a hydrocarbon (i.e., containing only carbon and hydrogen). A "hydrocarbyl group" can be acyclic or cyclic, and/or linear or branched. A "hydrocarbyl group" can include rings, ring systems, aromatic rings, and aromatic ring systems, which contain only carbon and hydrogen. "Hydrocarbyl groups" include, by way of example, aryl, alkyl, cycloalkyl, and alkylaryl/arylalkyl groups, amongst other groups as members.

An aliphatic compound is an acyclic or cyclic, saturated or unsaturated compound, excluding aromatic compounds. That is, an aliphatic compound is a non-aromatic organic compound. Aliphatic compounds, and therefore aliphatic groups, can contain organic functional group(s) and/or atom(s) other than carbon and hydrogen. An "aliphatic group" is a generalized group formed by removing one or more hydrogen atoms (as necessary for the particular group) from a carbon atom of an aliphatic compound.

The term "alkyl group" is used herein in accordance with the definition specified by IUPAC: a univalent group formed by removing a hydrogen atom from an alkane. An "alkyl group" can be acyclic or cyclic, and/or linear or branched, unless otherwise specified.

A cycloalkane is a saturated cyclic hydrocarbon, with or without side chains, for example, cyclobutane and methylcyclobutane. Unsaturated cyclic hydrocarbons having one endocyclic double or one triple bond are called cycloalkenes and cycloalkynes, respectively. Those having more than one such multiple bond are cycloalkadienes, cycloalkatrienes, and so forth. A "cycloalkyl group" is a univalent group derived by removing a hydrogen atom from a ring carbon atom from a cycloalkane. For example, a 1-methylcyclopropyl group and a 2-methylcyclopropyl group are illustrated as follows:

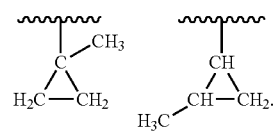

As used herein, "thiol sulfur" means sulfur from a —SH group (thiol group), while "sulfide sulfur" means sulfur from a —S— group (sulfide group). Sulfide sulfur groups encompass both intermolecular sulfide groups and intramolecular sulfide groups. The term "intermolecular sulfide" as used herein refers to sulfide bonds formed by a reaction between two molecules. The term "intramolecular sulfide" refers to sulfide bonds formed by a reaction within a single molecule.

As used herein, a "polythiol composition" refers to a composition comprising polythiol molecules. Polythiol molecules refer to molecules having two or more thiol groups per molecule (e.g., 2, 3, 4, 5, etc., thiol groups). For illustrative purposes, in addition to polythiol molecules having 2 or more SH groups, a polythiol composition also can contain compounds having only 1 thiol group, compounds having only one sulfur atom present as sulfide sulfur, etc. Furthermore, such polythiol compositions can contain other compounds and components, non-limiting examples of which can include solvents and other materials, as well as residual 5-vinylnorborn-2-ene from which the polythiol composition can be derived.

In some instances, the polythiol composition can be described, while in others, the sulfur-containing compounds (i.e., having at least 1 sulfur atom present as thiol sulfur or sulfide sulfur) of the polythiol composition can be described. Consequently, within this disclosure, properties associated with polythiol compositions can include contributions from the 5-vinylnorborn-2-ene from which the compositions can be formed, as well as other reactants and by-products. In some circumstances, it can be beneficial to refer only to the sulfur-containing compounds, as if the 5-vinylnorborn-2-ene, other reactants, by-products, and/or solvent are not present in the composition. Accordingly, within this disclosure, the term "sulfur-containing compounds," used in conjunction with the polythiol composition, refers to organic compounds within the composition that contain at least one sulfur atom present in a thiol sulfur group or sulfide sulfur group, and excludes any non-sulfur-containing compound (e.g., 5-vinylnorborn-2-ene reactant and/or solvent, among others), and excludes any sulfur-containing reactant (e.g., $H_2S$). In sum, a polythiol composition can include all materials in a composition comprising polythiol molecules, while the sulfur-containing compounds refer only to the compounds within the polythiol composition having at least sulfur atom present as a —SH or a —S— group.

As utilized herein, the mercaptan equivalent weight (SHEW) equals the molecular weight of a particular mercaptan molecule divided by the number of mercaptan groups in the mercaptan molecule, and has the units of grams/equivalent (g/eq). When referring to a composition of sulfur-containing compounds, the SHEW refers to an average SHEW of all the sulfur-containing compounds in the composition.

The terms "contact product," "contacting," and the like, are used herein to describe compositions and methods wherein the components are contacted together in any order, in any manner, and for any length of time. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, the term "contacting" is used herein to refer to materials which can be blended, mixed, slurried, dissolved, reacted, treated, or otherwise contacted in some other manner. Hence, "contacting" two or more components can result in a mixture, a reaction product, a reaction mixture, etc.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

The present invention provides polythiol compositions and methods of mercaptanizing 5-vinylnorborn-2-ene to produce such polythiol compositions. While not wishing to be bound by theory, a potential benefit of these polythiol compositions comprising sulfur-containing compounds, as described herein, is a faster cure time at lower temperatures for epoxy resins, as compared to that of current amine curing technology. A significant feature of particular polythiol compositions disclosed herein is the presence of sulfur-containing compounds having two —SH groups (thiol groups) and at least one —S— group (sulfide group), and a potential benefit of these polythiol compositions is less objectionable odor, as compared to other polythiol compositions that do not comprise sulfur-containing compounds with a sulfide group (—S— group). Moreover, the disclosed polythiol compositions comprising sulfur-containing compounds having two —SH groups (thiol groups) and at least one —S— group (sulfide group), as described herein, can have increased mercaptan equivalent weight, and/or higher average molecular weight, and/or increased viscosity, and/or lower vapor pressure, as compared to other polythiol compositions that do not comprise sulfur-containing compounds with a sulfide group (—S— group). Additionally, the processes disclosed herein to produce such compositions are believed to be superior to other processes due to fewer process steps, reduced waste, and less burdensome purification requirements.

Polythiol Compositions

Polythiol compositions consistent with embodiments of the invention disclosed and described herein can comprise sulfur-containing compounds, and these sulfur-containing compounds can comprise 5-(2-mercaptoethyl)norbornane-2-thiol and/or 5-(2-mercaptoethyl)norbornane-3-thiol, the chemical structures of which are shown below:

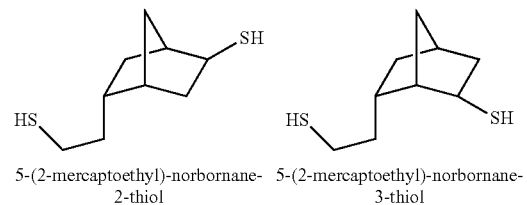 [SMILES: SCCC1CC2CC1CC2S ; SCCC1CC2CC(S)C1C2]

5-(2-mercaptoethyl)-norbornane-2-thiol    5-(2-mercaptoethyl)-norbornane-3-thiol Thus, the sulfur-containing compounds of the polythiol composition can comprise 5-(2-mercaptoethyl)norbornane-2-thiol, or can comprise 5-(2-mercaptoethyl)norbornane-3-thiol, or can comprise both 5-(2-mercaptoethyl)norbornane-2-thiol and 5-(2-mercaptoethyl)norbornane-3-thiol. Additionally, the sulfur-containing compounds of the polythiol composition can comprise other 5-(mercaptoethyl) norbornane-thiol isomers having the same molecular formulas as these two compounds, as would be recognized by those of skill in the art.

These illustrative and non-limiting examples of polythiol compositions comprising sulfur-containing compounds consistent with the present invention also can have any of the characteristics or properties provided herein, and in any combination.

In addition to 5-(2-mercaptoethyl)norbornane-2-thiol and/or 5-(2-mercaptoethyl)norbornane-3-thiol, the sulfur-containing compounds of the polythiol composition can comprise, for instance, one or more sulfide molecules having only two thiol sulfur groups (—SH), only one intermolecular sulfide group (—S—), and only two groups independently selected from a 5-(ethyl-2-yl)norborn-2-yl group and a 5-(ethyl-2-yl)norborn-3-yl group. The chemical structures of these groups are shown below:

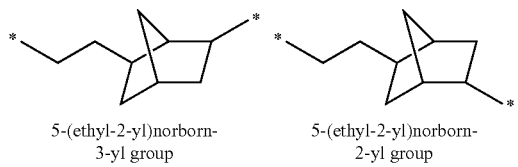

5-(ethyl-2-yl)norborn-3-yl group 5-(ethyl-2-yl)norborn-2-yl group

Illustrative and non-limiting examples of these sulfur-containing compounds having only two thiol sulfur groups (—SH), only one intermolecular sulfide group (—S—), and only two groups independently selected from a 5-(ethyl-2-yl)norborn-2-yl group and a 5-(ethyl-2-yl)norborn-3-yl group, can include the following compounds:

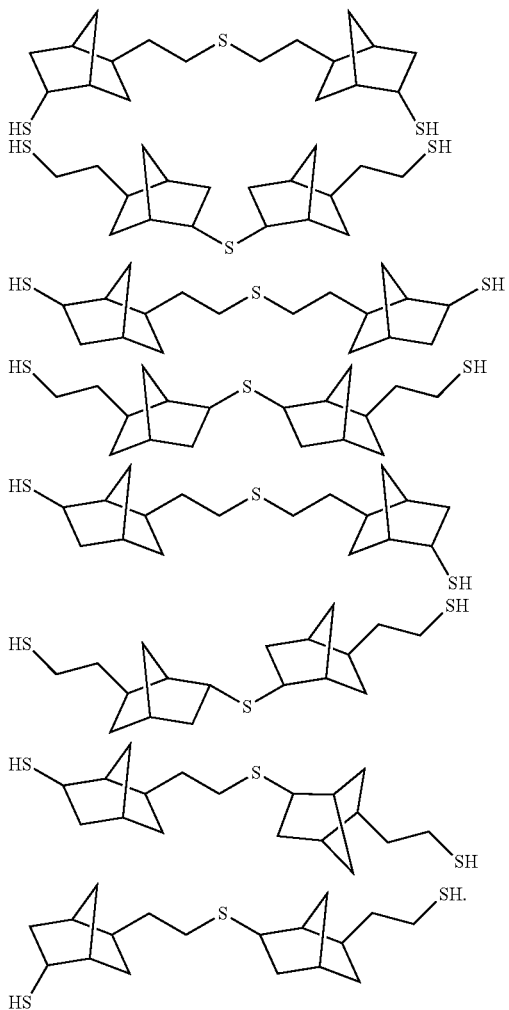

Moreover, as would be recognized by those of skill in the art, the sulfur-containing compounds of the polythiol composition can comprise other intermolecular sulfide isomers containing other isomeric 5-(ethyl)norbornyl groups having the same molecular formulas as these intermolecular sulfide compounds.

Sulfur-containing compounds of the polythiol composition can comprise 5-(2-mercaptoethyl)norbornane-2-thiol and/or 5-(2-mercaptoethyl)norbornane-3-thiol, and in another embodiment consistent with this invention, the sulfur-containing compounds of the polythiol composition can be characterized by a weight percentage of intermolecular sulfide compounds in a range from 2 wt. % to 90 wt. %. Yet, in another embodiment consistent with this invention, the sulfur-containing compounds of the polythiol composition can be characterized by an average thiol sulfur (—SH) to sulfide sulfur (—S—) molar ratio in a range from 1.5:1 to 1000:1.

In these and other embodiments, the polythiol compositions comprising sulfur-containing compounds disclosed herein can further comprise one or more sulfide molecules having only two thiol sulfur groups (—SH—), only two intermolecular sulfide groups (—S—), and only three groups independently selected from a 5-(ethyl-2-yl)norborn-2-yl group and a 5-(ethyl-2-yl)norborn-3-yl group. Illustrative and non-limiting examples of these sulfur-containing compounds having only two thiol sulfur groups (—SH), only two intermolecular sulfide groups (—S—), and only three groups independently selected from a 5-(ethyl-2-yl)norborn-2-yl group and a 5-(ethyl-2-yl)norborn-3-yl group, can include the following compounds:

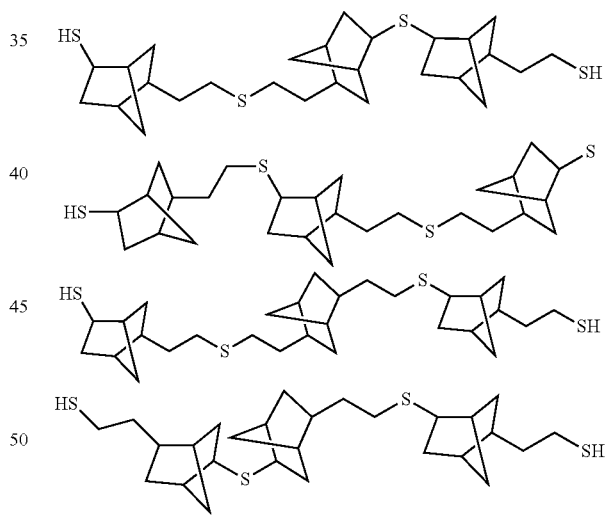

Moreover, as would be recognized by those of skill in the art, the sulfur-containing compounds of the polythiol composition can comprise other isomers having the same molecular formulas as these compounds having two intermolecular sulfide groups.

In an embodiment, the sulfur-containing compounds of the polythiol composition can have a minimum average thiol sulfur to sulfide sulfur molar ratio of 1.25:1, 1.5:1, 1.75:1, 2:1, 2.5:1, 3:1, or 4:1; additionally or alternatively, the sulfur-containing compounds can have a maximum average thiol sulfur to sulfide sulfur molar ratio of 1000:1, 500:1, 250:1, 100:1, 50:1, 40:1, or 25:1. Generally, the sulfur-containing compounds of the polythiol composition can have an average thiol sulfur to sulfide sulfur molar ratio ranging from any minimum molar ratio disclosed herein to any maximum molar ratio disclosed herein. Therefore, suitable non-limiting ranges for the average thiol sulfur to sulfide sulfur molar ratio can include the following ranges: from 1.25:1 to 1000:1, from 1.5:1 to 1000:1, from 1.5:1 to 500:1, from 3:1 to 500:1, from 1.5:1 to 100:1, from 1.75:1 to 100:1, from 2:1 to 100:1, from 2.5:1 to 100:1, from 1.5:1 to 50:1, from 4:1 to 50:1, from 1.5:1 to 40:1, from 2:1 to 40:1, from 2.5:1 to 40:1, from 1.5:1 to 25:1, from 2:1 to 25:1, or from 3:1 to 25:1. Other appropriate ranges for the average thiol sulfur to sulfide sulfur molar ratio are readily apparent from this disclosure.

The polythiol compositions can be further characterized by the amount of sulfide sulfur (sulfur from a —S— group) present in the sulfur-containing compounds of the composition. For instance, sulfur-containing compounds of the composition can have an average of from 0.1 wt. % to 10 wt. % sulfide sulfur. These percentages are based on the total sulfur-containing compounds of the composition, regardless of the number of thiol and/or sulfide groups. In certain embodiments, the sulfur-containing compounds of the polythiol composition can have a minimum average sulfide sulfur content of 0.1, 0.5, 1, 1.5, 2, 2.5, or 3 wt. %; additionally or alternatively, the sulfur-containing compounds can have a maximum average sulfide sulfur content of 10, 9, 8, 7, 6, 5, 4, or 3 wt. %. Generally, the sulfur-containing compounds of the polythiol composition can have an average sulfide sulfur content in a range from any minimum average sulfide sulfur content to any maximum sulfide sulfur content disclosed herein. Therefore, suitable non-limiting ranges for the average sulfide sulfur content of the sulfur-containing compounds can include the following ranges: from 0.1 to 10 wt. %, from 0.5 to 10 wt. %, from 1 to 10 wt. %, from 2 to 10 wt. %, from 3 to 10 wt. %, from 0.1 to 9 wt. %, from 1 to 8 wt. %, from 2 to 7 wt. %, from 0.1 to 8 wt. %, from 0.5 to 8 wt. %, from 1 to 8 wt. %, from 1 to 6 wt. %, from 1 to 5 wt. %, from 1 to 4 wt. %, from 1.5 to 8 wt. %, from 1.5 to 6 wt. %, from 1.5 to 5 wt. %, from 1.5 to 4 wt. %, from 1.5 to 3 wt. %, from 2 to 8 wt. %, from 3 to 8 wt. %, from 0.5 to 7 wt. %, from 1 to 7 wt. %, from 1.5 to 7 wt. %, from 2 to 7 wt. %, or from 2.5 to 7 wt. %. Other appropriate ranges for the average sulfide sulfur content are readily apparent from this disclosure.

Moreover, the polythiol compositions can be further characterized by the amount of thiol sulfur (sulfur from a —SH group) present in the sulfur-containing compounds of the composition. For example, sulfur-containing compounds of the composition can have an average of from 20 wt. % to 34 wt. % thiol sulfur. These percentages are based on the total sulfur-containing compounds, regardless of the number of thiol and/or sulfide groups. In particular embodiments, the sulfur-containing compounds of the polythiol composition can have a minimum average thiol sulfur content of 20, 21, 22, 23, 24, 25, 26, or 27 wt. %; additionally or alternatively, the sulfur-containing compounds can have a maximum average thiol sulfur content of 34, 33.5, 33, 32.5, 32, 31.5, or 31 wt. %. Generally, the sulfur-containing compounds of the polythiol composition can have an average thiol sulfur content in a range from any minimum average thiol sulfur content to any maximum average thiol sulfur content disclosed herein. Therefore, suitable non-limiting ranges for the average thiol sulfur content of the sulfur-containing compounds can include the following ranges: from 20 to 34 wt. %, from 21 to 34 wt. %, from 24 to 34 wt. %, from 20 to 33 wt. %, from 21 to 33 wt. %, from 23 to 33 wt. %, from 25 to 33 wt. %, from 27 to 33 wt. %, from 20 to 32 wt. %, from 22 to 32 wt. %, from 24 to 32 wt. %, from 26 to 32 wt. %, from 21 to 31 wt. %, from 22 to 31 wt. %, from 23 to 31 wt. %, from 24 to 31 wt. %, or from 25 to 31 wt. %. Other appropriate ranges for the average thiol sulfur content are readily apparent from this disclosure.

Consistent with particular embodiments of this invention, the polythiol compositions can be further characterized by the mercaptan equivalent weight (or SHEW) of the composition. For instance, the minimum SHEW of sulfur-containing compounds of the composition can be 94, 95, 96, 97, 98, 99, 100, or 105 g/eq; additionally or alternatively, the maximum SHEW of sulfur-containing compounds of the composition can be 150, 145, 140, 135, 130, or 125 g/eq. Generally, the sulfur-containing compounds of the polythiol composition can have a SHEW in a range from any minimum SHEW to any maximum SHEW disclosed herein. Therefore, suitable non-limiting ranges for the SHEW of the sulfur-containing compounds can include the following ranges: from 94 to 150, from 95 to 150, from 96 to 150, from 98 to 150, from 100 to 150, from 95 to 140, from 100 to 140, from 95 to 135, from 97 to 135, from 99 to 135, from 105 to 135, from 95 to 125, from 97 to 125, from 100 to 125, or from 105 to 125 g/eq. Other appropriate ranges for the SHEW are readily apparent from this disclosure.

In an embodiment, the weight percentage of 5-(2-mercaptoethyl)norbornane-2-thiol and 5-(2-mercaptoethyl)norbornane-3-thiol, in total, based on the sulfur-containing compounds of the polythiol composition, often can fall within a range from 10 wt. % to 95 wt. %. In certain embodiments, the sulfur-containing compounds of the polythiol composition can have a minimum weight percentage of 5-(2-mercaptoethyl)norbornane-2-thiol and 5-(2-mercaptoethyl)norbornane-3-thiol (in total) of 10, 30, 50, 60, or 70 wt. %; additionally or alternatively, a maximum weight percentage of 95, 92.5, 90, 87.5, 85, or 80 wt. %. Generally, the sulfur-containing compounds of the polythiol composition can have a total amount of 5-(2-mercaptoethyl)norbornane-2-thiol and 5-(2-mercaptoethyl)norbornane-3-thiol in a range from any minimum weight percentage to any maximum weight percentage disclosed herein. Therefore, suitable non-limiting ranges for the total amount of 5-(2-mercaptoethyl)norbornane-2-thiol and 5-(2-mercaptoethyl)norbornane-3-thiol present in the sulfur-containing compounds of the polythiol composition can include the following ranges: from 10 to 95 wt. %, from 30 to 95 wt. %, from 50 to 95 wt. %, from 60 to 95 wt. %, from 70 to 95 wt. %, from 10 to 90 wt. %, from 30 to 90 wt. %, from 50 to 90 wt. %, from 60 to 90 wt. %, from 70 to 90 wt. %, from 60 to 92.5 wt. %, from 60 to 87.5 wt. %, from 60 to 85 wt. %, from 70 to 92.5 wt. %, from 70 to 87.5 wt. %, or from 70 to 85 wt. %. In particular embodiments disclosed herein, a majority of the sulfur-containing compounds (e.g., greater than 50 wt. %, greater than 60 wt. %, greater than 70 wt. %, etc.) of the polythiol composition can be 5-(2-mercaptoethyl)norbornane-2-thiol and 5-(2-mercaptoethyl)norbornane-3-thiol. Other appropriate ranges for the total amount of 5-(2-mercaptoethyl)norbornane-2-thiol and/or 5-(2-mercaptoethyl)norbornane-3-thiol are readily apparent from this disclosure.

In an embodiment, the sulfur-containing compounds of the polythiol composition can be characterized by a weight percentage of intermolecular sulfide compounds that often falls within a range from 2 wt. % to 90 wt. %. In certain embodiments, the sulfur-containing compounds of the polythiol composition can have a minimum weight percentage of intermolecular sulfide compounds of 2, 3, 5, 7, or 10 wt. %; additionally or alternatively, a maximum weight percentage of 90, 70, 50, 40, 35, or 30 wt. %. Generally, the sulfur-containing compounds of the polythiol composition can have an amount of intermolecular sulfide compounds in a range from any minimum weight percentage to any maximum weight percentage disclosed herein. Therefore, suitable non-limiting ranges for the amount of intermolecular sulfide compounds present in the sulfur-containing compounds of the polythiol composition can include the following ranges: from 2 to 90 wt. %, from 2 to 70 wt. %, from 2 to 50 wt. %, from 2 to 40 wt. %, from 2 to 30 wt. %, from 5 to 90 wt. %, from 5 to 50 wt. %, from 5 to 35 wt. %, from 5 to 30 wt. %, from 10 to 90 wt. %, from 10 to 50 wt. %, from 10 to 40 wt. %, from 10 to 30 wt. %, from 7 to 40 wt. %, from 7 to 35 wt. %, or from 7 to 30 wt. %. In particular embodiments disclosed herein, a small percentage of the sulfur-containing corn pounds (e.g., less than 40 wt. %, less than 35 wt. %, less than 30 wt. %, etc.) of the polythiol compositions can be intermolecular sulfide compounds. Other appropriate ranges for the amount intermolecular sulfide compounds are readily apparent from this disclosure.

In an embodiment, the sulfur-containing compounds of the polythiol composition can be characterized by a weight ratio of 5-(2-mercaptoethyl)norbornane-2-thiol and 5-(2-mercaptoethyl)norbornane-3-thiol, in total, to intermolecular sulfide compounds that often falls within a range from 1:1 to 10:1. In certain embodiments, the sulfur-containing compounds of the polythiol composition can have a minimum weight ratio of 5-(2-mercaptoethyl)norbornane-2-thiol and 5-(2-mercaptoethyl)norbornane-3-thiol (in total) to intermolecular sulfide compounds of 1:1, 1.1:1, 1.2:1, 1.3:1, 1.4:1, 1.5:1, or 2:1; additionally or alternatively, a maximum weight ratio of 10:1, 9:1, 8:1, 7:1, or 6:1. Generally, the weight ratio of the total amount of 5-(2-mercaptoethyl)norbornane-2-thiol and 5-(2-mercaptoethyl)norbornane-3-thiol to the total amount of intermolecular sulfide compounds can range from any minimum weight ratio to any maximum weight ratio disclosed herein. Therefore, suitable non-limiting ranges for the weight ratio of 5-(2-mercaptoethyl)norbornane-2-thiol and 5-(2-mercaptoethyl)norbornane-3-thiol, in total, to intermolecular sulfide compounds can include the following ranges: from 1:1 to 10:1, from 1.2:1 to 10:1, from 1.5:1 to 10:1, from 2:1 to 10:1, from 1.1:1 to 8:1, from 1.2:1 to 8:1, from 1.4:1 to 8:1, from 1.3:1 to 9:1, from 1.5:1 to 9:1, from 2:1 to 9:1, from 1.2:1 to 7:1, from 1.4:1 to 7:1, from 1.5:1 to 7:1, from 1.2:1 to 6:1, or from 1.5:1 to 6:1. Other appropriate ranges for the weight ratio of the total amount of 5-(2-mercaptoethyl)norbornane-2-thiol and 5-(2-mercaptoethyl)norbornane-3-thiol to the total amount of intermolecular sulfide compounds are readily apparent from this disclosure.

In some embodiments, the polythiol composition can contain 5-vinylnorborn-2-ene, mono-sulfur compounds, and/or intramolecular sulfide compounds. For instance, the weight percentage of 5-vinylnorborn-2-ene in the polythiol composition can be less than or equal to 5 wt. %, less than or equal to 2 wt. %, less than or equal to 1 wt. %, less than or equal to 0.5 wt. %, less than or equal to 0.25 wt. %, less than or equal to 0.1 wt. %, or less than or equal to 0.05 wt. %. Additionally or alternatively, the sulfur-containing compounds of the polythiol composition can contain mono-sulfur compounds at an amount less than or equal to 5 wt. %, less than or equal to 2 wt. %, less than or equal to 1 wt. %, less than or equal to 0.5 wt. %, less than or equal to 0.25 wt. %, less than or equal to 0.1 wt. %, or less than or equal to 0.05 wt. %. Additionally or alternatively, the sulfur-containing compounds of the polythiol composition can contain the intramolecular sulfide compounds,

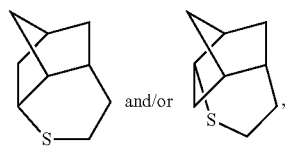 [SMILES: C1CC2CC3CC(S1)C2C3 ; C1CC2CC3CC2CC3S1]

at an amount less than or equal to 5 wt. %, less than or equal to 2 wt. %, less than or equal to 1 wt. %, less than or equal to 0.5 wt. %, less than or equal to 0.25 wt. %, less than or equal to 0.1 wt. %, or less than or equal to 0.05 wt. %.

While not being limited thereto, the polythiol compositions disclosed herein can be polythiol compositions derived from 5-vinylnorborn-2-ene. In some embodiments, the polythiol compositions disclosed herein can be produced by any process described herein. For instance, these polythiol compositions can be produced by a process comprising contacting 5-vinylnorborn-2-ene, $H_2S$, and optionally, a phosphite compound; and forming the polythiol composition. The molar ratio of $H_2S$ to carbon-carbon double bonds of the 5-vinylnorborn-2-ene can be in a range, for example, from 2:1 to 500:1, from 2:1 to 50:1, or from 5:1 to 35:1. Additional information on processes for producing such polythiol compositions is provided herein.

Processes for Producing Polythiol Compositions

In accordance with certain embodiments of this invention, a process for producing a polythiol composition can comprise contacting 5-vinylnorborn-2-ene, $H_2S$, and optionally, a phosphite compound; and forming the polythiol composition. Generally, the features of the process (e.g., the use of the phosphite compound, the hydrogen sulfide to carbon-carbon double bond ratio, the components of and/or features of the polythiol composition, and the conditions under which the polythiol composition is formed, among others) are independently described herein and these features can be combined in any combination to further describe the disclosed process.

In an embodiment, the contacting step (step 1 of the process) can comprise, contacting 5-vinylnorborn-2-ene, $H_2S$, and additional unrecited materials (e.g., a solvent). In other embodiments, the contacting step can consist essentially of contacting 5-vinylnorborn-2-ene and $H_2S$; or alternatively, consist of contacting 5-vinylnorborn-2-ene and $H_2S$. In some embodiments, the contacting step (step 1 of the process) can comprise contacting the 5-vinylnorborn-2-ene, $H_2S$, the optional phosphite compound, and additional unrecited materials (e.g., a solvent). In other embodiments, the contacting step can consist essentially of contacting 5-vinylnorborn-2-ene, $H_2S$, and the optional phosphite compound or, alternatively, consist of contacting 5-vinylnorborn-2-ene, $H_2S$, and the optional phosphite compound. Likewise, additional materials or features can be employed in the forming step (step 2 of the process). For instance, the formation of the polythiol composition can occur in the presence of ultraviolet light, discussed further herein. Moreover, it is contemplated that when the processes for forming polythiol compositions utilize a phosphite compound, the processes can employ more than one phosphite compound. In some embodiments, the contacting step (step 1) and the forming step (step 2) can occur simultaneously; alternatively, the contacting step (step 1) and the forming step (step 2) can occur separately; or alternatively, the contacting step (step 1) and the forming step (step 2) can occur sequentially.

In the processes disclosed herein, the minimum molar ratio of $H_2S$ to carbon-carbon double bonds of the 5-vinylnorborn-2-ene can be 2:1, 3:1, 5:1, or 8:1, while the maximum molar ratio of $H_2S$ to carbon-carbon double bonds of the 5-vinylnorborn-2-ene can be 500:1, 150:1, 100:1, 50:1, 35:1, or 25:1. Therefore, suitable ranges for the ratio of HS to carbon-carbon double bonds of the 5-vinylnorborn-2-ene can include, but are not limited to, the following ranges: from 2:1 to 500:1, from 2:1 to 150:1, from 2:1 to 50:1, from 2:1 to 25:1, from 3:1 to 100:1, from 3:1 to 50:1, from 3:1 to 35:1, from 5:1 to 500:1, from 5:1 to 100:1, from 5:1 to 35:1, from 5:1 to 25:1, from 8:1 to 500:1, from 8:1 to 150:1, from 8:1 to 50:1, from 8:1 to 35:1, or from 8:1 to 25:1.

Generally, without being limited to theory, an increase in the ratio of $H_2S$ to carbon-carbon double bonds can be used to increase the average thiol sulfur to sulfide sulfur molar ratio and/or the average thiol sulfur content of the sulfur-containing compounds in the polythiol compositions disclosed herein. In contrast, without being limited to theory, a decrease in the ratio of $H_2S$ to carbon-carbon double bonds generally can be used to increase the mercaptan equivalent weight and/or the average sulfide sulfur content of the sulfur-containing compounds in the polythiol compositions disclosed herein.

When the phosphite compound is used in the processes disclosed herein, the minimum molar ratio of the phosphite compound to carbon-carbon double bonds of the 5-vinylnorborn-2-ene can be 0.0005:1, 0.001:1, 0.005:1, or 0.006:1, while the maximum molar ratio of the phosphite compound to carbon-carbon double bonds of the 5-vinylnorborn-2-ene can be 0.1:1, 0.075:1, or 0.05:1. Therefore, suitable ranges for the molar ratio of the phosphite compound to carbon-carbon double bonds of the 5-vinylnorborn-2-ene can include, but are not limited to, the following: from 0.0005:1 to 0.1:1, from 0.0005:1 to 0.075:1, from 0.0005:1 to 0.05:1, from 0.001:1 to 0.1:1, from 0.001:1 to 0.075:1:1, from 0.001:1 to 0.05:1, from 0.005:1 to 0.1:1, from 0.005:1 to 0.05:1, from 0.006:1 to 0.001:1, from 0.006:1 to 0.05:1, from 0.008:1 to 0.05:1, from 0.008:1 to 0.04:1, from 0.01:1 to 0.1:1, or from 0.01:1 to 0.05:1.

Independently, the contacting step and the forming step of the process for forming a polythiol composition can be conducted at a variety of temperatures, pressures, and time periods. For instance, the temperature at which the 5-vinylnorborn-2-ene, $H_2S$, and the phosphite compound (if used) are initially contacted can be the same as, or different from, the temperature at which the polythiol composition is formed. As an illustrative example, in the contacting step, the 5-vinylnorborn-2-ene, $H_2S$, and the phosphite compound (if used) can be contacted initially at temperature T1 and, after this initial combining, the temperature can be increased to a temperature T2 to allow the formation of the polythiol composition. Likewise, the pressure can be different in the contacting step than in the forming step. Often, the time period in the contacting step is referred to as the contact time, while the time period in the forming step is referred to as the reaction time. The contact time and the reaction time can be different; alternatively, the contact time and the reaction time can be the same.

In an embodiment, the contacting step of the process for forming a polythiol composition can be conducted at a temperature in a range from −30° C. to 150° C.; alternatively, from −20° C. to 130° C.; alternatively, from −10° C. to 100° C.; alternatively, from −5° C. to 80° C.; alternatively, from 0° C. to 60° C.; or alternatively, from 1° C. to 45° C. In these and other embodiments, after the initial contacting, the temperature can be changed, if desired, to another temperature for the formation of the polythiol composition. Accordingly, the forming of the polythiol composition can be conducted at a temperature in a range from −30° C. to 150° C.; alternatively, from −20° C. to 130° C.; alternatively, from −10° C. to 100° C.; alternatively, from −5° C. to 80° C.; alternatively, from 0° C. to 60° C.; or alternatively, from 10° C. to 45° C. These temperature ranges also are meant to encompass circumstances where the forming step can be conducted at a series of different temperatures, instead of at a single fixed temperature, falling within the respective ranges.

In an embodiment, the contacting step and/or the forming step of the process of forming a polythiol composition can be conducted at a total reactor pressure in a range from 30 to 1500 psig, such as, for example, from 50 to 1500 psig. In some embodiments, the polythiol formation in step 2 can be conducted at total reactor pressure in a range from 50 to 1500 psig; alternatively, from 50 to 1000 psig; alternatively, from 50 to 750 psig; alternatively, from 50 to 500 psig; or alternatively, from 100 to 500 psig.

The contacting step of the process is not limited to any particular range. That is, the 5-vinylnorborn-2-ene, $H_2S$, and the phosphite compound (if used) can be initially contacted rapidly, or over a longer period of time, before commencing the reaction and/or the formation of the polythiol composition. Hence, the contacting step can be conducted, for example, in a time period ranging from as little as about 1-30 seconds to as long as about 1-6 hours. In some embodiments, the contact time can be in a range from 15 minutes to 3 hours, or from 30 minutes to 2 hours. The appropriate reaction time for the formation of the polythiol composition can depend upon, for example, the reaction temperature and the molar ratios of the respective components in the contacting step, among other variables. However, the polythiol composition often can be formed over a time period in the forming step that can be in a range from 1 minute to 8 hours, such as, for example, from 2 minutes to 6 hours, from 5 minutes to 5 hours, from 10 minutes to 4 hours, or from 15 minutes to 3 hours.

In embodiments of this invention, once the 5-vinylnorborn-2-ene, $H_2S$, and the phosphite compound (if used) are contacted, the polythiol composition can be formed in the presence of electromagnetic radiation. For instance, the polythiol composition can be formed in the presence of ultraviolet light. Additionally or alternatively, the polythiol composition can be formed by light photolysis initiation of a free radical initiator. Additionally or alternatively, the polythiol composition can be formed under conditions suitable for the thermal decomposition of a free radical initiator. Additionally, a photoinitiator can be utilized in conjunction with ultraviolet light or light photolysis initiation of a free radical initiator. Free radicals, therefore, can be generated in situ by a suitable energy source, or can be generated by the thermal decomposition of a free radical initiator, or by a combination of these sources. The polythiol composition can be formed in the presence of free radicals from any one of aforementioned sources, including combinations thereof, but is not limited to free radicals generated only by these means.

In an embodiment, the contacting of the 5-vinylnorborn-2-ene, $H_2S$, and the phosphite compound (if used) can be conducted prior to the generation of free radicals and the formation of the polythiol composition.

When the polythiol composition is formed in the presence of ultraviolet light, ultraviolet light in the range, for example, from 172 to 450 nm, from 172 to 380 nm, or from 172 to 320 nm, can be employed. Ultraviolet light can be supplied from ultraviolet lamps, but other sources of ultraviolet light can be employed, and are to be considered within the scope of the present invention.

The free radical initiator can be any free radical initiator capable of forming free radicals under thermal decomposition or light photolysis. For example, the free radical initiator employed for the formation of the polythiol composition can comprise a —N=N— group, a —O—O— group, or combinations thereof; alternatively, a —N=N— group; or alternatively, a —O—O— group. Free radical initiators, therefore, can include, but are not limited to, peroxy compounds, organic azo compounds, or combinations thereof; alternatively, peroxy compounds; or alternatively, organic azo compounds. Peroxy compounds which can be utilized can include peroxides, hydroperoxides, peroxyesters, diacylperoxides, and percarbonates; alternatively, peroxides; alternatively, hydroperoxides; alternatively, peroxyesters; alternatively, diacylperoxides; or alternatively, percarbonates. In an embodiment, the peroxide can be a dialkyl peroxide. In an embodiment, the hydroperoxide can be an alkyl hydroperoxide. In an embodiment, the peroxy ester can be an alkyl peroxyalkanoate, or alternatively, an alkyl peroxyarenoate. In an embodiment, the diacylperoxide can be a diaroyl peroxide, or alternatively, a diakoyl peroxide. In an embodiment, the percarbonate can be a dihydrocarbyl percarbonate; alternatively, a diarylpercarbonate; or alternatively, a dialkylpercarbonate. Generally, the hydrocarbon and/or alkane group(s) utilized in any peroxy compound can be a $C_1$ to $C_{30}$, $C_2$ to $C_{18}$, $C_2$ to $C_{10}$, or $C_2$ to $C_5$ hydrocarbon and/or alkane group(s). Generally, the arene group utilized in any peroxy compound can be a $C_6$ to $C_{30}$, $C_6$ to $C_{18}$, $C_6$ to $C_{15}$, or $C_6$ to $C_{10}$ arene group(s). Illustrative non-limiting examples of peroxy compounds which can be utilized can include, but are not limited to, diisobutyryl peroxide, 1-(2-ethylhexanoylperoxy)-1,3-dimethylbutyl peroxypivalate, cumylperoxyneodecanoate, 1,1,3,3-tetramethylbutyl peroxyneodecanoate, t-butyl peroxyneodecanoate, 1,1,3,3-tetramethylbutyl peroxypivalate, t-butyl peroxyneoheptanoate, t-amyl peroxypivalate, t-butyl peroxypivalate, di(3,5,5-trimethylhexanoyl) peroxide, dilauroyl peroxide, didecanoyl peroxide, 2,5-dimethyl-2,5-di(2-ethylhexanoylperoxy)hexane, 1,1,3,3-tetramethylbutyl peroxy 2-ethylhexanoate, t-amyl peroxy 2-ethylhexanoate, dibenzoyl peroxide, acetyl peroxide t-butyl peroxy 2-ethylhexanoate, t-butyl peroctanoate, t-butyl peroxydiethylacetate, t-butyl peroxyisobutyrate, t-butyl peroxy 3,5,5-trimethyl hexanoate, t-butyl peroxyacetate, t-butyl peoxybenzoate, 2,4-dichlorobenzoyl peroxide, t-butylpermaleic acid, di-t-butyl diperphthalate, di(4-t-butylcyclohexyl) peroxydicarbonate, di(2-ethylhexyl) peroxydicarbonate, dibutyl peroxydicarbonate, dicetyl peroxydicarbonate, dimyristyl peroxydicarbonate, t-amylperoxy 2-ethylhexyl carbonate, t-butylperoxy isopropyl carbonate, t-butylperoxy 2-ethylhexyl carbonate, 1,1-di(t-butylperoxy) 3,5,5-trimethylcyclohexane, 2,2-di(4,4-di(t-butylperoxy)cyclohexyl)propane, 1,1-di(t-butylperoxy) cyclohexane, 2,2-di(t-butylperoxy)butane, di(t-amyl) peroxide, dicumyl peroxide, di(t-butylperoxyispropropyl) benzene, 2,5-dimethyl-2,5-di(t-butylperoxy)hexane, t-butyl cumyl peroxide, 2,5-dimethyl-2,5-di(t-butylperoxy)hexyne-3, di-t-butyl peroxide, 3,6,9-triethyl-3,6,9-trimethyl-1,4,7-triperoxoane, t-butyl hydroperoxide, methyl benzyl hydroperoxide, octylperbenzoate, methyl ethyl ketone peroxide, acetone peroxide, or combinations thereof.

Non-limiting examples of suitable azo compounds include α,α'-azo diisobutyronitrile (AIBN), azobenzene, azomethane, 2,2'-azodi(2-methylbutyronitrile), 2,2'-azobis (4-methoxy-2,4-dimethyl valeronitrile), dimethyl 2,2'-azobis(2-methylpropionate), 1,1'-azobis(cyclohexane-1-carbonitrile), 1-[(cyano-1-methylethyl)azo] formamide, 2,2'-azobis(N-cyclohexyl-2-methylpropionamide), 2,2'-azobis (2,4-dimethyl valeronitrile), 2,2'-azobis(2-methylbutyronitrile), 2'-azobis[N-(2-propenyl)-2-methylpropionamide], 2,2'-azobis(N-butyl-2-methylpropionamide), 2,2'-azobis {2-methyl-N-[1,1-bis (hydroxymethyl)-2-hydroxyethyl]propionamide, 2,2'-azobis [2-methyl-N-(2-hydroxyethyl)propionamide], 2,2'-azobis[2-(2-imidazolin-2-yl)propane], 2,2'-azobis{2-methyl-N-[2-(1-hydroxybutyl)]propionamide}, 2,2'-azobis(2-methylpropionitrile), 4,4'-azobis(4-cyanovaleric acid), 2,2'-azobis(2-methylpropane), 2,2'-azobis(2-methylpropionamidine)dihydrochloride, methylpropionitrile, azodicarboxamide, or combinations thereof.

Generally, the peroxide and azo compound free radical initiators that can be utilized in accordance with the present invention decompose under first order kinetics. Skilled artisans can readily find the first order kinetic parameters which can be utilized to describe the decomposition of a particular free radical catalyst from sources such as chemical suppliers, industry reference publications, and/or open literature publications. Under first order kinetics, the time required for a given fraction (or percentage) of the free radical initiator to decompose, at a specific temperature, into initiating species is independent of the concentration of the free radical. This phenomenon is often stated as a half-life; that is, the time in which one-half of the free radical initiator decomposes under specific conditions (e.g., temperature). According to the first order kinetics, the half-life of a free radical initiator is defined as the time it takes one-half of the initiator to decompose at a particular temperature. Using the available first order kinetic parameters for a particular free radical initiator, the concentration of the free radical initiator present in the reaction mixture can be determined at a particular time during the reaction based upon the knowledge of the amount of free radical initiator added to the reaction, the times at which additional (if any) free radical initiator is added to the reaction, and the temperature profile of the reaction.

When the polythiol composition is formed under conditions utilizing the thermal decomposition of a free radical initiator, the polythiol composition can be formed at a temperature within a temperature range of the 1 hour half-life of the free radical initiator. Alternatively, when the polythiol composition is formed under conditions utilizing the thermal decomposition of a free radical initiator, the polythiol composition can be formed using a free radical initiator having a half-life within a time range at the temperature utilized to form the polythiol composition. For example, the formation of the polythiol composition can be conducted at a temperature within ±25° C. of the 1 hour half-life of the free radical initiator. In other embodiments, the polythiol composition can be formed at a temperature within ±20° C. of the 1 hour half-life of the free radical initiator; alternatively, at a temperature within ±15° (C of the 1 hour half-life of the free radical initiator; alternatively, at a temperature within ±10° C. of the 1 hour half-life of the free radical initiator. In another embodiment, the polythiol composition can be formed using a free radical initiator having a half-life within a range from 0.1 to 10 hours at the temperature the polythiol composition is formed (i.e., in step 2 of the process). Alternatively, the polythiol composition can be formed using a free radical initiator having a half-life ranging from 0.1 to 10 hours, from 0.25 to 4 hours, or from 0.5 to 2 hours, at the temperature the polythiol composition is formed. As above, in some embodiments of this invention, the polythiol composition can be formed at a temperature in a range from −30° C. to 150° C.; alternatively, from −20° C.

to 130° C.; alternatively, from −10° C. to 100° C.; alternatively, from −5° C. to 80° C.; alternatively, from 0° C. to 60° C.; or alternatively, from 1° C. to 45° C.

Depending upon the particular free radical initiator, a free radical initiator can produce a different number of free radical reaction-initiating species per mole of free radical initiator; thus, the concentration of the free radical initiator can be stated in terms which describe the number of free radical reaction-initiating species generated per mole of free radical initiator. The term "equivalent" is often used to describe the number of reaction-initiating species produced per mole of free radical initiator. For example, one skilled in the art will readily recognize that di-t-butylperoxide can generate two free radical reaction-initiating species per mole of di-t-butylperoxide, while 2,5-bis(t-butylperoxy)-2,5-dimethylhexane can generate four free radical reaction-initiating species per mole of 2,5-bis(t-butyl peroxy)-2,5-dimethylhexane.

In some embodiments, a photoinitiator can be utilized. Commercially available photoinitiators include, by way of example, Irgacure® 184 (1-hydroxy-cyclohexyl-phenyl-ketone), Irgacure® 500 (50% 1-hydroxy-cyclohexyl-phenyl-ketone and 50% benzophenone), Irgacure® 819 (Bis-(2,4, 6-trimethylbenzoyl)-phenylphosphineoxide), and Irgacure® 127 (2-hydroxy-1-{4-[4-(2-hydroxy-2-methyl-propionyl)-benzyl]-phenyl}-2-methyl-propan-1-one), all available from Ciba Specialty Chemicals, and Duracure 1173 (2-hydroxy-2-methyl-1-phenyl-1-propanone).

When a free radical initiator is present in the contacting step and/or in the forming step of the process, the weight percentage of the free radical initiator, based on the weight of the 5-vinylnorborn-2-ene, can be in a range from 0.05 to 10 wt. %, from 0.1 to 9 wt. %, from 0.2 to 5 wt. %, or from 0.1 to 2 wt. %. When a photoinitiator is present in the contacting step and/or in the forming step of the process, the weight percentage of the photoinitiator, based on the weight of the 5-vinylnorborn-2-ene, can be less than or equal to 5 wt. %, less than or equal to 3 wt. %, less than or equal to 2 wt. %, or less than or equal to 1.5 wt. %, and typical non-limiting ranges can include from 0.01 to 5 wt. %, from 0.05 to 5 wt. %, from 0.5 to 3 wt. %, or from 1 to 4 wt. %. Other amounts of the free radical initiator and/or the photoinitiator can be employed depending on the specific process conditions used to form the polythiol composition (e.g., temperature, pressure, time) and the respective ratios of $H_2S$ to 5-vinylnorborn-2-ene and of phosphite compound to 5-vinylnorborn-2-ene, amongst other factors. It is contemplated that more than one free radical initiator, more than one photoinitiator, or combinations of free radical initiator(s) and photoinitiator(s), can be employed.

In an embodiment, the polythiol composition can be formed in the absence of a solvent. However, in other embodiments, the polythiol can be formed in the presence of a solvent. Typically, when used, the solvent can be present in an amount up to 1,000 wt. %, based on the weight of the 5-vinylnorborn-2-ene. Alternatively, the formation of the polythiol can be performed in the presence of a solvent in an amount up 750 w. %, up to 500 wt. %, up to 250 wt. %, up to 200 wt. %, up to 150 wt. %, or up to 100 wt. %. When a solvent is utilized, the minimum amount of solvent utilized can be at least 5 wt. %, at least 10 wt. %, at least 25 wt. %, at least 50 wt. %, or at least 75 wt. %, based on the weight of the 5-vinylnorborn-2-ene. Generally, the amount of solvent which can be utilized can range from any minimum amount of solvent disclosed herein to any maximum amount of solvent disclosed herein. In some non-limiting embodiments, the formation of the polythiol can be performed in the presence of a solvent in an amount of from 5 wt. % to 1,000 wt. %, from 10 wt. % to 750 wt. %, from 25 wt. % to 500 wt. %, from 50 wt. % to 250 wt. %, from 50 wt. % to 150 wt. %, or from 75 wt. % to 125 wt. %, based on the weight of the 5-vinylnorborn-2-ene. The solvent can be contacted with the 5-vinylnorborn-2-ene, $H_2S$, and the phosphite compound (if used) in the contacting step of the process, and remain present during the formation of the polythiol composition. Alternatively, the solvent can be added after the initial contacting in the contacting step. Solvents which can be utilized as the solvent are described herein, and these solvents can be utilized without limitation in the processes described herein.

In the processes for producing a polythiol composition disclosed herein, it is contemplated that at least 60% of the carbon-carbon double bonds of the 5-vinylnorborn-2-ene can react to form a sulfur-containing group in the polythiol composition. Often, at least 65% of the carbon-carbon double bonds of the 5-vinylnorborn-2-ene can react to form a sulfur-containing group; alternatively, at least 70%; alternatively; at least 75%; alternatively, at least 80%; alternatively, at least 85%; alternatively, at least 90%; alternatively, at least 95%; alternatively, at least 98%; or alternatively, at least 99%.

Once formed, the polythiol composition, or specific fractions of the polythiol composition, can be purified and/or isolated and/or separated using suitable techniques which include, but are not limited to, evaporation, distillation, crystallization, extraction, washing, decanting, filtering, drying, including combinations of more than one of these techniques. In one embodiment, the process for producing a polythiol composition can further comprise a step of separating or removing at least a portion of the $H_2S$, of the phosphite compound (if used), of the 5-vinylnorborn-2-ene, of compounds having only one sulfur atom, or any combination thereof, from the polythiol composition. For instance, these materials can be separated or removed by distillation, by short path distillation, by wiped film evaporation, or by a combination of these techniques.

Consistent with embodiments of this invention, these processes for producing polythiol compositions can be used to produce any of the polythiol compositions disclosed herein.

Phosphite Compounds

Generally, the phosphite compound employed in certain processes for forming a polythiol composition disclosed herein can comprise, consist essentially of, or consist of, a compound having the formula:

$$P(OR^1)_3.$$

In this formula, each $R^1$ independently can be a $C_1$-$C_{18}$ hydrocarbyl group; alternatively, a $C_3$-$C_{10}$ hydrocarbyl group; alternatively, a $C_1$-$C_5$ hydrocarbyl group; alternatively, a $C_1$-$C_{18}$ alkyl group; alternatively, a $C_1$-$C_{10}$ alkyl group; alternatively, a $C_1$-$C_5$ alkyl group; alternatively, a $C_6$-$C_{18}$ aryl group; or alternatively, a $C_6$-$C_{10}$ to aryl group. Accordingly, each $R^1$ independently can be a methyl group, an ethyl group, a propyl group, a butyl group, a pentyl group, a hexyl group, a heptyl group, an octyl group, a nonyl group, or a decyl group; alternatively, $R^1$ can be a methyl group, an ethyl group, a propyl group, a butyl group, or a pentyl group; alternatively, $R^1$ can be a methyl group; alternatively, $R^1$ can be an ethyl group; alternatively, $R^1$ can be a propyl group; alternatively, $R^1$ can be a butyl group; alternatively, $R^1$ can be a pentyl group; alternatively, $R^1$ can be a hexyl group; alternatively, $R^1$ can be a heptyl group; alternatively, $R^1$ can be an octyl group; alternatively, $R^1$ can be a nonyl group; or alternatively, $R^1$ can be a decyl group. In some embodiments, each $R^1$ independently can be a phenyl group, a tolyl group, a xylyl group, or a naphthyl group; alternatively, a phenyl group, a tolyl group, or a xylyl group; alternatively, a phenyl group; alternatively, a tolyl group; alternatively, a xylyl group; or alternatively, a naphthyl group.

In accordance with an embodiment of this invention, the phosphite compound can comprise, consist essentially of, or consist of, a trialkylphosphite, or alternatively, a triarylphosphite. In accordance with another embodiment of this invention, the phosphite compound can comprise, consist essentially of, or consist of, trimethylphosphite, triethylphosphite, tributylphosphite, or combinations thereof. Yet, in accordance with another embodiment of this invention, the phosphite compound can comprise trimethylphosphite; alternatively, triethylphosphite; or alternatively, tributylphosphite. In another embodiment, the phosphite compound can comprise, consist essentially of, or consist of, triphenylphosphite.

Solvents

As described herein, the polythiol composition can be formed in the presence of a solvent. The solvent can comprise, consist essentially of, or consist of, a hydrocarbon, an aromatic hydrocarbon, a ketone, an alcohol, an ether, or combinations thereof. Hence, mixtures and/or combinations of solvents can be utilized in the processes of forming polythiol compositions disclosed herein.

In an embodiment, the solvent employed in forming the polythiol composition can comprise, consist essentially of, or consist of, a hydrocarbon solvent. Suitable hydrocarbon solvents can include, for example, aliphatic hydrocarbons, petroleum distillates, or combinations thereof. Aliphatic hydrocarbons which can be useful as the solvent include $C_3$ to $C_{20}$ aliphatic hydrocarbons; alternatively, $C_4$ to $C_{15}$ aliphatic hydrocarbons; or alternatively, $C_5$ to $C_{10}$ aliphatic hydrocarbons. The aliphatic hydrocarbons can be cyclic or acyclic, and/or can be linear or branched, unless otherwise specified.

Non-limiting examples of suitable acyclic aliphatic hydrocarbon solvents that can be utilized singly or in any combination include pentane (n-pentane or a mixture of linear and branched $C_5$ acyclic aliphatic hydrocarbons), hexane (n-hexane or a mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), decane (n-decane or a mixture of linear and branched $C_{10}$ acyclic aliphatic hydrocarbons), and combinations thereof; alternatively, pentane (n-pentane or a mixture of linear and branched $C_5$ acyclic aliphatic hydrocarbons), hexane (n-hexane or a mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), and combinations thereof; alternatively, hexane (n-hexane or a mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), and combinations thereof; alternatively, pentane (n-pentane or a mixture of linear and branched $C_5$ acyclic aliphatic hydrocarbons); alternatively, hexane (n-hexane or a mixture of linear and branched $C_6$ acyclic aliphatic hydrocarbons); alternatively, heptane (n-heptane or a mixture of linear and branched $C_7$ acyclic aliphatic hydrocarbons); or alternatively, octane (n-octane or a mixture of linear and branched $C_8$ acyclic aliphatic hydrocarbons).

In an embodiment, the solvent employed in forming the polythiol composition can comprise, consist essentially of, or consist of, an aromatic hydrocarbon solvent. Aromatic hydrocarbons can include $C_6$ to $C_{30}$ aromatic hydrocarbons; alternatively, $C_6$ to $C_{20}$ aromatic hydrocarbons; or alternatively, $C_6$ to $C_{10}$ aromatic hydrocarbons. Non-limiting examples of suitable aromatic hydrocarbons that can be utilized singly or in any combination include benzene, toluene, xylene (including ortho-xylene, meta-xylene, para-xylene, or mixtures thereof), and ethylbenzene, or combinations thereof; alternatively, benzene; alternatively, toluene; alternatively, xylene (including ortho-xylene, meta-xylene, para-xylene or mixtures thereof); or alternatively, ethylbenzene.

In an embodiment, the solvent employed in forming the polythiol composition can comprise, consist essentially of, or consist of, a ketone solvent, an alcohol solvent, an ether solvent, or combinations thereof; alternatively, a ketone solvent; alternatively, an alcohol solvent; or alternatively, an ether solvent. Suitable ketones, alcohols, or ethers include $C_2$ to $C_{20}$ ketones, alcohols, or ethers; alternatively, $C_2$ to $C_{10}$ ketones, alcohols, or ethers; or alternatively, $C_2$ to $C_5$ ketones, alcohols, or ethers. Non-limiting examples of suitable ketone solvents can include acetone, ethyl methyl ketone, and combinations thereof. Non-limiting examples of suitable alcohol solvents can include methanol, ethanol, propanol, isopropanol, n-butanol, isobutanol, pentanol, hexanol, heptanol, octanol, benzyl alcohol, phenol, cyclohexanol, or combinations thereof. Suitable ether solvents can be cyclic or acyclic, non-limiting examples of which can include dimethyl ether, diethyl ether, methyl ethyl ether, monoethers or diethers of glycols (e.g., dimethyl glycol ether), furans, substituted furans, dihydrofuran, substituted dihydrofurans, tetrahydrofuran (THF), substituted tetrahydrofurans, tetrahydropyrans, substituted tetrahydropyrans, 1,3-dioxanes, substituted 1,3-dioxanes, 1,4-dioxanes, substituted 1,4-dioxanes, or mixtures thereof. In an embodiment, each substituent of a substituted furan, substituted dihydrofuran, substituted tetrahydrofuran, substituted tetrahydropyran, substituted 1,3-dioxane, or substituted 1,4-dioxane, can be a $C_1$ to $C_5$ alkyl group.

Articles

An article of manufacture comprising the polythiol composition can be produced using the polythiol compositions. For example, the polythiol compositions disclosed herein can be used as curing agents for epoxy and urethane adhesives and other end-use articles. In an embodiment, the article can further comprise a substrate. For instance, the adhesives and other articles can be used with, or can contain, metal (e.g., aluminum, steel, copper, etc.), wood, glass, ceramic, and plastic substrates, including combinations of these substrates.

Formulations containing the polythiol compositions can contain other additives or components depending upon the desired properties and end-use application. These additives or components can include, but are not limited to, catalysts, solvents/diluents, plasticizers, fillers, fibers, pigments/colorants, pigment dispersing agents, flow modifiers, surface modifiers, antioxidants or stabilizers, or combinations thereof.

It is contemplated that formulations, adhesives, and other articles of manufacture that contain and/or are produced from the polythiol compositions disclosed herein can have lower levels of offensive or objectionable odor, as compared to formulations, adhesives, and other articles of manufacture that contain polythiol compositions produced by other processes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

The polythiol compositions were produced in accordance with the following general procedure. Either a 5-L, or a 379-L (100-gallon) ultraviolet light reactor was used for each example; working volumes were 4 L and 80 gallon, respectively. The 5-L stainless-steel reactor had a quartz lamp well mounted horizontal to an off-set stir shaft. The reactors were equipped with a thermowell, cooling coils, a charge port, a sample port, and a bottom drain valve. To the respective reactor, the desired amount of 5-vinylnorborn-2-ene was added to the reactor through the charge part. No phosphite compound, free radical initiator, photoinitiator, or solvent was utilized in these experiments. The reactor was sealed and pressure checked with nitrogen at 300-450 psig. The reactor was vented and the desired amount of $H_2S$ was charged to the reactor; the operating pressure was generally between 235 and 425 psig. The reactor contents were heated and controlled by setting the external circulating bath at the desired temperature of about 25-35° C. The 379-L reactor had the quartz lamp and lamp well mounted vertically in an external pipe. Reagents were charged to the 379-L reactor and the fluid was pumped up-flow through the external pipe with the lamp well and back into the 379-L reactor.

The reactants were allowed to mix for 15 to 30 minutes. After this mixing period, the ultraviolet lamp was turned on. The ultraviolet lamp typically required from 3 to 7 minutes to reach full power. The ultraviolet lamp power was 100 watts for the 5-L reactor, and from 2.5 to 7.5 kW for the 379-L reactor.

When the conversion of carbon-carbon double bonds was complete or the desired reaction time was reached, the ultraviolet lamp was turned off. The $H_2S$ was then slowly vented from the reactor. For the 5-L reactor, the reactor was purged with nitrogen and the contents were drained via a bottom drain valve. The reaction product was placed in a rotoevaporator at 60° C. and low vacuum to remove additional residual $H_2S$ and other light materials (e.g., solvent). For the 379-L reactor, the reactor was vented to the flare line and then further degassed. In some examples, the crude reactor product was analyzed using gas chromatography (GC).

Product composition information based upon GC-FID data is presented in area percentages, unless otherwise specified. GC-FID analysis was performed on an Agilent® 7890 gas chromatograph using a 2 m×0.25 mm×1.0 μm film DB-1 capillary column with Flame Ionization Detector using helium as the carrier gas. A sample of the product composition was dissolved in acetone at a 3:1 acetone to product sample ratio and 0.4 μL of the diluted sample product was injected into a split/splitless PVT inlet. The GC inlet parameters were an inlet temperature of 275° C., an initial inlet pressure of 2.4 psi, a final inlet pressure of 5.2 psi, constant flow conditions of 2 mL/minute of helium, and an inlet split ratio of 50:1. The temperature program for the GC-FID analysis was an initial temperature of 70° C. for 2 minutes, followed by a temperature ramp of 8° C./minute to 200° C., followed by a temperature ramp of 15° C./minute to 300° C. and a temperature hold at 300° C. for 10 minutes. The GC-FID detector was operated at a temperature of 300° C. having a hydrogen gas flow of 25 mL/minute, an air flow of 300 mL/minute, and a makeup helium gas flow of 25 mL/minute. GC-FID analysis data was acquired with Agilent Chemstation®.

Weight percentage of thiol sulfur (Wt. % SH) was determined by iodine titration, and weight percentage of total sulfur (Wt. % Total S) was determined by x-ray analysis. Mercaptan equivalent weight (SHEW) is equal to the average molecular weight (g/mol) of the mercaptan divided by the number of SH functionality present in the mercaptan molecule, and can be calculated as follows: SHEW=(32.06 grams mercaptan sulfur/equivalent)/(wt. % SH/100), where wt. % SH=grams thiol sulfur (or mercaptan sulfur) per gram of the polythiol composition.

GPC molecular weight data were obtained using an Agilent HP1100 Isocratic HPLC thermostatted autosampler system with control module using PolymerLabs Cirrus software to control the system and for data processing. An Agilent 1100 series RI detector was used with solvent degassing. The columns used were PLgel Minimix E columns from PolymerLabs. The solvent used was tetrahydrofuran (THF), and samples were approximately 0.5% w/w in THF. The column temperature was 40° C. and refractive index detector was set at 35° C. The injection volume was 20 μL. Flow rate was 0.3 mL/min and run time was about 26 min. Two polystyrene standard sets were used having the following molecular weights (g/mol): standard set 1 (20020, 4910, 1200, and 92) and standard set 2 (38640, 10730, 2340, 480, 266, and 92). Both sets of standards were used for each sample.

Examples 1-2

Polythiol Compositions Produced from 5-vinylnorborn-2-ene

The polythiol composition of Example 1 (30:1 molar ratio) was produced as follows. First, 174 grams of 5-vinylnorborn-2-ene were charged to the 5-L UV reactor, and then pressurized to 300 psig with nitrogen. Liquefied $H_2S$ was then fed to the reactor from a cylinder until the desired weight (3000 grams) had been added. The circulating bath was set at 30° C., and the fluid was circulated through the cooling coils in the reactor. The thiolation reaction was completed in about 10-15 minutes. During the initial 3-4 minutes, the bulk temperature increased from 27.4 to 38.5° C., while the reactor pressure increased from 366 to 412 psig. After this initial period, the temperature and pressure decreased. The polythiol composition of Example 2 was produced in a manner similar to that of Example 1, but using a 5:1 molar ratio of $H_2S$ to double bonds of the 5-vinylnorborn-2-ene, instead of the 30:1 ratio of Example 1.

Table I summarizes the results of mercaptanizing 5-vinylnorborn-2-ene at a 30:1 molar ratio of $H_2S$ to double bonds of the 5-vinylnorborn-2-ene (Example 1), and at a 5:1 molar ratio of $H_2S$ to double bonds of the 5-vinylnorborn-2-ene (Example 2). FIG. 1 is a GPC molecular weight plot obtained from the HPLC analysis illustrating the respective amount of material versus the logarithm of molecular weight for the polythiol compositions of Examples 1-2, and Table I summarizes the GPC molecular weight area percentages obtained from the HPLC analysis. In FIG. 1, the left-hand axis and dashed line apply to Example 2, while the right-hand axis and solid line apply to Example 1.

The N=1 peak represents compounds containing only one 5-(ethyl)norbornyl group including 5-(2-mercaptoethyl)norbornane-2-thiol and 5-(2-mercaptoethyl)norbornane-3-thiol. The N=2 peak represents sulfide molecules containing only two 5-(ethyl)norbornyl groups (e.g., a 5-(ethyl-2-yl)norborn-2-yl group and a 5-(ethyl-2-yl)norborn-3-yl group, among others). The N=3 peak represents sulfide molecules containing only three 5-(ethyl)norbornyl groups (e.g., a 5-(ethyl-2-yl)norborn-2-yl group and a 5-(ethyl-2-yl)norborn-3-yl group, among others). The N=4 peak represents sulfide molecules containing only four 5-(ethyl)norbornyl groups (e.g., a 5-(ethyl-2-yl)norborn-2-yl group and a 5-(ethyl-2-yl)norborn-3-yl group, among others). Table I and FIG. 1 demonstrate that more materials containing sulfide groups are produced at the lower 5:1 molar ratio as compared to the higher 30:1 molar ratio.

TABLE I

Polythiol Compositions of Examples 1-2

| Example | 1 | 2 |
|---|---|---|
| N = 1 | 84.0 | 55.8 |
| N = 2 | 13.7 | 27.0 |
| N = 3 | 2.3 | 11.7 |
| N = 4+ | — | 5.5 |
| $H_2S$/olefin molar ratio | 30:1 | 5:1 |

Examples 3-5

Polythiol Compositions Produced from 5-vinylnorborn-2-ene after Distillation

The polythiol composition of Example 3 (30:1 molar ratio) was produced as described for Example 1. The polythiol composition of Example 4 (15:1 ratio) was produced in the 5-L UV reactor as follows. Approximately 330 grams of 5-vinylnorborn-2-ene and 2800 grams of $H_2S$ were used. The circulating bath temperature was set at 25° C. Maximum bulk temperature was reached at about 9-10 minutes with a temperature increase of 10° C. The conversion was estimated to be at 50% when the maximum temperature was reached. Total reaction time was 45-50 minutes to reach maximum conversion. GC analysis of the crude product of Example 4 showed 3.27% mono-sulfur fraction, 86.75% non-sulfide dimercaptans, and 9.86% sulfide heavies.

The polythiol composition of Example 5 (10:1 ratio) was produced in a manner similar to that of Example 4 (15:1 ratio), except that 500 grams of 5-vinylnorborn-2-ene and 2700 grams of $H_2S$ were used, and an exotherm of 13° C. was noted at 10 minutes, along with a significant increase in reactor pressure. GC analysis of the crude product of Example 5 showed 2.34% mono-sulfur lights, 84.63% non-sulfide dimercaptans, and 12.89% sulfide heavies.

Table II summarizes the results of mercaptanizing 5-vinylnorborn-2-ene at a 30:1, 15:1, and 10:1 molar ratio of $H_2S$ to double bonds of the 5-vinylnorborn-2-ene, followed by distillation under vacuum at a pressure less than 5 torr. The N=1, N=2, and N=3 data were determined from GPC, as described in Examples 1-2. The % mono-S, % DiSH, and % Heavies were determined using gas chromatography, where % mono-S equals the amount of compounds having one sulfur atom; % Di-SH equals the amount of compounds having two thiol sulfur groups and no sulfide groups; and % Heavies equals the amount of compounds having at least one sulfide group. Wt. % SH is the total amount of thiol sulfur in the composition, and Wt. % Total S is the total amount of sulfur in the composition. SHEW is the mercaptan equivalent weight (g/eq).

From Table II, and surprisingly, the $H_2S$/olefin molar ratio did not have a significant impact on the resultant polythiol composition (e.g., a) the % mono-S, % Di-SH, and % heavies as determined by area percent from GC analysis, b) the Wt. % Total S and Wt. % SH as determined by x-ray analysis and iodine titration, respectively, and c) N=1, N=2, and N=3 as determined by GPC molecular weight data obtained from the HPLC analysis) when residual 5-vinylnorborn-2-ene and other lights were removed via distillation.

TABLE II

Polythiol Compositions of Examples 3-5

| Example | 3 | 4 | 5 |
|---|---|---|---|
| $H_2S$/olefin molar ratio | 30:1 | 15:1 | 10:1 |
| % mono-S | 0.05 | 0.04 | 0.04 |
| % Di-SH | 86.01 | 87.87 | 84.21 |
| % Heavies | 13.94 | 12.09 | 15.75 |
| Wt. % Total S | 33.2 | 32.7 | 32.7 |
| Wt. % SH | 32.3 | 31.5 | 31.1 |
| SHEW | 99.2 | 101.8 | 103.2 |
| N = 1 | 84.4 | 85.9 | 84.1 |
| N = 2 | 13.9 | 12.7 | 14.1 |
| N = 3 | 1.7 | 1.5 | 1.8 |

Examples 6-7

Polythiol Compositions Produced from 5-vinylnorborn-2-ene Before and after Distillation The crude product of Example 6 was produced by charging a mixture of the 5-vinylnorborn-2-ene and $H_2S$ to the 379-L UV reactor at a 10:1 ratio, and turning on the UV lamp initiate the reaction. The olefin conversion to a sulfur-containing group was monitored by observing the olefin peak using Raman spectroscopy. At the 10:1 ratio, the reaction exotherm was more difficult to control than at a higher molar ratio, as well as controlling the pressure rise, so the lamp wattage was reduced to 2.5 kW after 6 minutes, and then turned off at 7 minutes of reaction time. The lamp was then turned back on at 9 minutes at 7.5 kW, but lowered to 5 kW and then 2.5 kW to maintain the pressure in the desired working range. The lamp was shut off at the 14 minute mark, turned back on at the 17 minute mark, and the reaction was essentially complete at about 35-40 minutes of total reaction time. This experiment utilized 36.5 kg of 5-vinylnorborn-2-ene and 207 kg of $H_2S$. At the end of the reaction, $H_2S$ was vented, and the reaction mixture was then sparged with nitrogen to remove residual $H_2S$ to a low level, resulting in the crude polythiol composition of Example 6. Based on GC analysis, the crude product of Example 6 contained substantially no unreacted 5-vinylnorborn-2-ene and 1.5-2% mono-sulfur compounds prior to distillation.

Table III summarizes certain process conditions and analytical results for the polythiol compositions of Examples 6-7 and fractions 6A-6E. A total of 51.4 kg of the crude polythiol composition (Example 6) was produced at the 10:1 molar ratio of $H_2S$ to olefin double bonds of the 5-vinylnorborn-2-ene, and this product was separated into 5 batches (Examples 6A-6E) for distillation. Distillations of the crude product of Example 6 were performed at about 5-10 mm Hg and an 18:3 reflux to take-off ratio. Take-off was started 30 minutes after reflux was achieved in the column. The total take-off time was about 5 hours. When the desired amount of lights was removed, the material remaining in the distillation unit was cooled and transferred to a product storage container for subsequent analysis as shown in Table III. Approximately 98.2% of the starting crude product (Example 6) was recovered as the final blended product (Example 7) after batch distillation at pressures ranging from 5-10 mm Hg.

The following abbreviations and conventions are used in Table III: % SH is the total amount of thiol sulfur in the composition in wt. %; % Lights represents the amount of compounds not having at least two sulfur atoms present in the composition; % MVNB minor isomers represents dimercaptan compounds having only one 5-(ethyl)norbornyl group (which are not 5-(2-mercaptoethyl)norbornane-2-thiol or 5-(2-mercaptoethyl)norbornane-3-thiol) present in the composition; % MNVB major isomers represents the amount of 5-(2-mercaptoethyl)norbornane-2-thiol and 5-(2-mercaptoethyl)norbornane-3-thiol present in the composition; and % Sulfides is the amount of compounds having a sulfide group.

distilled using laboratory distillation as described in Examples 6-7, and in a pilot plant batch distillation column apparatus having an electrically heated (bayonet) 125-gallon kettle and column containing Koch-Sulzer 316 high efficiency packing (approximately 8-10 theoretical trays). The pressures for the pilot plant batch distillations were maintained in the 20-30 mm Hg range.

The following abbreviations and conventions are used in Table IV. Analytical testing was via gas chromatography, where % VNB+lights equals the amount of 5-vinylnorborn-2-ene and compounds not having at least two sulfur atoms; % mono-S equals the amount of compounds having one sulfur atom; % Di-SH equals the amount of compounds having two thiol sulfur groups and no sulfide groups; and % Total Heavies equals the amount of compounds having at least one sulfide group. Generally, as shown in Table IV, the pilot plant distillation products contained a higher percentage of sulfide compounds as compared to the lab distillation products, likely due to the higher kettle temperature (due to the higher operating pressure) used in the pilot plant distillation process. Example 9 contained a higher amount of residual 5-vinylnorborn-2-ene and sulfide content prior to distillation, and the trend of higher sulfide content was consistent after distillation.

TABLE III

Polythiol Compositions of Examples 6-7

| Example Number | Crude Product 6 | Distillation Batches 6A | 6B | 6C | 6D | 6E | Blended Product 7 |
|---|---|---|---|---|---|---|---|
| Wt. Charged (kg) |  | 10.133 | 10.888 | 10.158 | 9.910 | 10.316 |  |
| Wt. Overhead (kg) |  | 0.167 | 0.153 | 0.169 | 0.178 | 0.127 |  |
| Wt. Kettle Product (kg) |  | 9.802 | 10.741 | 9.961 | 9.843 | 10.146 |  |
| % SH - Kettle Product |  | 29.37 | 29.77 | 29.48 | 29.17 | 29.19 | 29.50 |
| % Lights | 1.546 | 0.049 | 0.040 | 0.030 | 0.029 | 0.042 | 0.036 |
| % MVNB minor isomers | 1.543 | 1.317 | 1.371 | 1.342 | 1.308 | 1.382 | 1.378 |
| % MNVB major isomers | 77.760 | 77.812 | 77.773 | 78.264 | 78.969 | 78.595 | 78.866 |
| % Sulfides | 19.151 | 20.822 | 20.816 | 20.365 | 19.695 | 19.980 | 19.720 |
| Kettle Reflux (° C.) |  | 167 | 169 | 164 | 166 | 164 |  |
| Head Reflux (° C.) |  | 87.4 | 86.0 | 85.2 | 85.6 | 86.6 |  |
| Final Kettle (° C.) |  | 176 | 175 | 178 | 172 | 174 |  |
| Final Overhead (° C.) |  | 147.6 | 146.5 | 145.5 | 145.7 | 145.4 |  |

Examples 8-12

Polythiol Compositions Produced from 5-vinylnorborn-2-ene Before and after Distillation Table IV summarizes certain process conditions and analytical results for the polythiol compositions of Examples 8-12 produced in the 1000-L reactor equipped with 6 vertically suspended 7.5 kW UV lamps that can be operated independently. Examples 8-11 were produced at a 30:1 molar ratio of $H_2S$ to double bonds of the 5-vinylnorborn-2-ene, and Example 12 was produced at a 15:1 molar ratio of $H_2S$ to double bonds of the 5-vinylnorborn-2-ene. Examples 8-12 were produced in a manner similar to that of Example 6, independently switching the UV lamps on and off to maintain the reaction pressure in the desired working range until the desired conversion was achieved. At the end of each batch, the $H_2S$ was vented from the reactor, and the reaction mixture was then sparged with nitrogen to remove residual $H_2S$ to a low level. The 5 batches produced about 3200 lb of crude product. Portions of the batches were

TABLE IV

Polythiol Compositions of Examples 8-12

| Example Number | 8 | 9 | 10 | 11 | 12 |
|---|---|---|---|---|---|
| % VNB + lights | 0.16 | 0.42 | 0.03 | 0.05 | 0.04 |
| % mono S | 0.64 | 10.34 | 6.17 | 3.68 | 3.03 |
| % Di-SH | 87.28 | 74.14 | 81.77 | 84.56 | 83.88 |
| % Total Heavies | 11.92 | 15.10 | 12.03 | 11.71 | 13.05 |
| Analysis After Lab Distillation | | | | | |
| % mono S | 0.15 | 0.04 | 0.19 | 0.03 | 0.09 |
| % Di-SH | 85.74 | 79.75 | 80.63 | 81.82 | 79.78 |
| % Total Heavies | 14.11 | 20.21 | 19.18 | 18.15 | 20.14 |
| Analysis After Pilot Plant Distillation | | | | | |
| % mono S | 0.05 | 0.03 | 0.01 | 0.10 | 0.04 |
| % Di-SH | 77.25 | 64.72 | 79.33 | 79.40 | 76.85 |
| % Total Heavies | 22.70 | 35.25 | 20.66 | 20.50 | 23.11 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A polythiol composition comprising sulfur-containing compounds, the sulfur-containing compounds comprising:
(i) 5-(2-mercaptoethyl)norbornane-2-thiol and/or 5-(2-mercaptoethyl)norbornane-3-thiol; and
(ii) one or more sulfide molecules having only two thiol sulfur groups (—SH), only one intermolecular sulfide group (—S—), and only two groups independently selected from a 5-(ethyl-2-yl)norborn-2-yl group and a 5-(ethyl-2-yl)norborn-3-yl group.

Embodiment 2

A polythiol composition comprising sulfur-containing compounds, the sulfur-containing compounds comprising: 5-(2-mercaptoethyl)norbornane-2-thiol and/or 5-(2-mercaptoethyl)norbornane-3-thiol;
wherein the sulfur-containing compounds of the polythiol composition have a weight percentage of intermolecular sulfide compounds in a range from 2 wt. % to 90 wt. %.

Embodiment 3

A polythiol composition comprising sulfur-containing compounds, the sulfur-containing compounds comprising: 5-(2-mercaptoethyl)norbornane-2-thiol and/or 5-(2-mercaptoethyl)norbornane-3-thiol;
wherein the sulfur-containing compounds of the polythiol composition have an average thiol sulfur (—SH) to sulfide sulfur (—S—) molar ratio in a range from 1.5:1 to 1000:1.

Embodiment 4

The composition of any one of the preceding embodiments, wherein the sulfur-containing compounds of the polythiol composition further comprise one or more sulfide molecules having only two thiol sulfur groups (—SH), only two intermolecular sulfide groups (—S—), and only three groups independently selected from a 5-(ethyl-2-yl)norborn-2-yl group and a 5-(ethyl-2-yl)norborn-3-yl group.

Embodiment 5

The composition of any one of the preceding embodiments, wherein the polythiol composition has a maximum weight percentage of 5-vinylnorborn-2-ene in the polythiol composition in any range disclosed herein, e.g., less than or equal to 5 wt. %, less than or equal to 1 wt. %, less than or equal to 0.5 wt. %, less than or equal to 0.1 wt. %, etc.

Embodiment 6

The composition of any one of the preceding embodiments, wherein the sulfur-containing compounds of the polythiol composition have a maximum weight percentage of compounds having the structures:

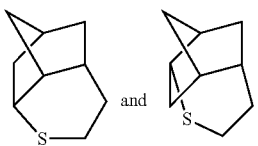 [SMILES: C1CC2CC3CC(S1)C2C3 ; C1CC2CC3CC2CC3S1]

in any range disclosed herein, e.g., less than or equal to 5 wt. %, less than or equal to 2 wt. %, less than or equal to 1 wt. %, less than or equal to 0.5 wt. %, etc.

Embodiment 7

The composition of any one of the preceding embodiments, wherein the sulfur-containing compounds of the polythiol composition have a maximum weight percentage of mono-sulfur compounds in any range disclosed herein, e.g., less than or equal to 5 wt. %, less than or equal to 2 wt. %, less than or equal to 1 wt. %, less than or equal to 0.5 wt. %, etc.

Embodiment 8

The composition of any one of the preceding embodiments, wherein the sulfur-containing compounds of the polythiol composition have a weight percentage of 5-(2-mercaptoethyl)norbornane-2-thiol and 5-(2-mercaptoethyl)norbornane-3-thiol (in total) in any range disclosed herein, e.g., from 10 wt. % to 95 wt. %, from 30 wt. % to 90 wt. %, from 50 wt. % to 95 wt. %, from 50 wt. % to 90 wt. %, from 70 wt. % to 95 wt. %, from 70 wt. % to 90 wt. %, etc.

Embodiment 9

The composition of any one of the preceding embodiments, wherein the sulfur-containing compounds of the polythiol composition have a weight percentage of intermolecular sulfide compounds in any range disclosed herein, e.g., from 2 wt. % to 90 wt. %, 5 wt. % to 90 wt. %, from 10 wt. % to 70 wt. %, from 5 wt. % to 50 wt. %, from 10 wt. % to 50 wt. %, from 5 wt. % to 35 wt. %, from 10 wt. % to 30 wt. %, etc.

Embodiment 10

The composition of any one of the preceding embodiments, wherein the sulfur-containing compounds of the polythiol composition have a weight ratio of 5-(2-mercaptoethyl)norbornane-2-thiol and 5-(2-mercaptoethyl)norbornane-3-thiol (in total) to intermolecular sulfide compounds in any range disclosed herein, e.g., from 1:1 to 10:1, from 1.2:1 to 8:1, from 1.4:1 to 7:1.

Embodiment 11

The composition of any one of the preceding embodiments, wherein the sulfur-containing compounds of the polythiol composition have an average thiol sulfur to sulfide sulfur molar ratio in any range of average thiol sulfur to sulfide sulfur molar ratios disclosed herein, e.g., from 1.5:1 to 1000:1, from 2:1 to 100:1, from 2:1 to 40:1, etc.

Embodiment 12

The composition of any one of the preceding embodiments, wherein the sulfur-containing compounds of the polythiol composition have an average weight percentage of sulfide sulfur in any range of average weight percentages of sulfide sulfur disclosed herein, e.g., from 0.1 to 10 wt. %, from 0.1 to 8 wt. %, from 1 to 8 wt. %, from 1 to 6 wt. %, from 1 to 5 wt. %, from 1.5 to 8 wt. %, from 1.5 to 6 wt. %, from 1.5 to 4 wt. %, from 1.5 to 3 wt. %, from 2 to 7 wt. %, etc.

Embodiment 13

The composition of any one of the preceding embodiments, wherein the sulfur-containing compounds of the polythiol composition have an average weight percentage of thiol sulfur (—SH) in any range of average weight percentages of thiol sulfur disclosed herein, e.g., from 20 to 34 wt. %, from 21 to 34 wt. %, from 22 to 32 wt. %, from 27 to 33 wt. %, etc.

Embodiment 14

The composition of any one of the preceding embodiments, wherein the sulfur-containing compounds of the polythiol composition have a SHEW in any range of SHEW's disclosed herein, e.g., from 94 to 150 g/eq, from 95 to 150 g/eq, from 98 to 150 g/eq, from 100 to 125 g/eq, etc.

Embodiment 15

A process for producing a polythiol composition, the process comprising:
1) contacting:
 a) 5-vinylnorborn-2-ene;
 b) $H_2S$; and
 c) optionally, a phosphite compound; and
2) forming the polythiol composition;
wherein a molar ratio of $H_2S$ to carbon-carbon double bonds of the 5-vinylnorborn-2-ene is in a range from 2:1 to 500:1.

Embodiment 16

The process of embodiment 15, wherein the process further comprises a step of removing at least a portion of the $H_2S$, of the phosphite compound (if used), of the 5-vinylnorborn-2-ene, of compounds having only one sulfur atom, or combinations thereof from the polythiol composition.

Embodiment 17

The process of embodiment 16, wherein the $H_2S$, the phosphite compound (if used), the 5-vinylnorborn-2-ene, the compounds having only one sulfur atom, or combinations thereof, are removed by wiped film evaporation, distillation, short path distillation, or a combination thereof.

Embodiment 18

The process of any one of embodiments 15-17, wherein the molar ratio of $H_2S$ to carbon-carbon double bonds of the 5-vinylnorborn-2-ene is in any range of molar ratios of $H_2S$ to carbon-carbon double bonds disclosed herein, e.g., from 2:1 to 150:1, from 2:1 to 50:1, from 3:1 to 50:1, from 5:1 to 35:1; from 8:1 to 25:1, etc.

Embodiment 19

The process of any one of embodiment 15-18, wherein a molar ratio of the phosphite compound to carbon-carbon double bonds of the 5-vinylnorborn-2-ene is in any range of molar ratios of the phosphite compound to carbon-carbon double bonds disclosed herein, e.g., from 0.0005:1 to 0.10:1, from 0.005:1 to 0.05:1, etc.

Embodiment 20

The process of embodiment 19, wherein the phosphite compound comprises a compound having the formula, $P(OR^1)_3$, wherein each $R^1$ is independently any $C_1$-$C_{10}$ hydrocarbyl group disclosed herein.

Embodiment 21

The process of embodiment 19, wherein the phosphite compound comprises trimethylphosphite, triethylphosphite, tributylphosphite, or any combination thereof.

Embodiment 22

The process of any one of embodiments 15-21, wherein the polythiol composition is formed at a temperature in any range of temperatures disclosed herein, e.g., from −30° C. to 150° C., from −20° C. to 130° C., from −10° C. to 100° C., from −5° C. to 80° C., from 0° C. to 60° C., etc.

Embodiment 23

The process of any one of embodiments 15-22, wherein the polythiol composition is formed in the presence of electromagnetic radiation.

Embodiment 24

The process of any one of embodiments 15-22, wherein the polythiol composition is formed in the presence of ultraviolet light.

Embodiment 25

The process of any one of embodiments 15-22, wherein the polythiol composition is formed in the presence of ultraviolet light and a photoinitiator, and wherein the photoinitiator is present at an amount within any weight percentage range disclosed herein, e.g., less than or equal to 5 wt. %, less than or equal to 3 wt. %, less than or equal to 2 wt. %, less than or equal to 1.5 wt. %, etc., based on the weight of the 5-vinylnorborn-2-ene.

Embodiment 26

The process of any one of embodiments 15-22, wherein the polythiol composition is formed in the presence of a free radical initiator, and wherein the free radical initiator is present at an amount within any weight percentage range disclosed herein, e.g., from 0.1 to 9 wt. %, from 0.1 to 2 wt. %, etc., based on the weight of the 5-vinylnorborn-2-ene.

Embodiment 27

The process of embodiment 26, wherein the polythiol composition is formed at conditions suitable for a thermal decomposition of the free radical initiator.

Embodiment 28

The process of any one of embodiments 15-27, wherein the polythiol composition is formed in the presence of any solvent disclosed herein, e.g., a hydrocarbon solvent, an aromatic hydrocarbon solvent, a ketone solvent, an alcohol solvent, an ether solvent, or any combination thereof.

Embodiment 29

The process of any one of embodiments 15-28, wherein at least 90%, at least 95%, at least 98%, etc., of the carbon-carbon double bonds of the 5-vinylnorborn-2-ene have reacted to form a sulfur-containing group.

Embodiment 30

The process of any one of embodiments 15-29, wherein the polythiol composition of any one of embodiments 1-14 is produced.

Embodiment 31

The composition of any one of embodiments 1-14 produced by the process of any one of embodiments 15-29.

Embodiment 32

An article of manufacture comprising the composition of any one of embodiments 1-14 and 31.

Embodiment 33

An article of manufacture comprising the composition of any one of embodiments 1-14 and 31, wherein the article comprises an adhesive.

We claim:

1. A polythiol composition comprising sulfur-containing compounds, the sulfur-containing compounds comprising:
   (i) from 50 wt. % to 95 wt. % 5-(2-mercaptoethyl) norbornane-2-thiol and/or 5-(2-mercaptoethyl)norbornane-3-thiol;
   (ii) one or more sulfide molecules having only two thiol sulfur groups (—SH), only one intermolecular sulfide group (—S—), and only two groups independently selected from a 5-(ethyl-2-yl)norborn-2-yl group and a 5-(ethyl-2-yl)norborn-3-yl group; and
   (iii) less than 1 wt. % mono-sulfur compounds;
   wherein the polythiol composition contains less than 1 wt. % 5-vinylnorborn-2-ene.

2. The composition of claim 1, wherein the sulfur-containing compounds further comprise one or more sulfide molecules having only two thiol sulfur groups, only two intermolecular sulfide groups, and only three groups independently selected from a 5-(ethyl-2-yl)norborn-2-yl group and a 5-(ethyl-2-yl)norborn-3-yl group.

3. The composition of claim 1, wherein the sulfur-containing compounds are characterized by:
   an average thiol sulfur to sulfide sulfur molar ratio in a range from 1.5:1 to 1000:1;
   an average of from 0.1 wt. % to 10 wt. % sulfide sulfur;
   an average of from 20 wt. % to 34 wt. % thiol sulfur; and
   a mercaptan equivalent weight in a range from 95 to 150 g/eq.

4. The composition of claim 1, wherein the sulfur-containing compounds are characterized by:
   an average thiol sulfur to sulfide sulfur molar ratio in a range from 2:1 to 40:1;
   an average of from 1 wt. % to 8 wt. % sulfide sulfur; and
   an average of from 22 wt. % to 32 wt. % thiol sulfur.

5. The composition of claim 1, wherein the sulfur-containing compounds contain from 5 wt. % to 35 wt. % intermolecular sulfide compounds.

6. The composition of claim 1, wherein the sulfur-containing compounds have a weight ratio of 5-(2-mercaptoethyl)norbornane-2-thiol and 5-(2-mercaptoethyl)norbornane-3-thiol, in total, to intermolecular sulfide compounds in a range from 1.2:1 to 8:1.

7. An article of manufacture comprising the polythiol composition of claim 1.

8. The article of claim 7, wherein the article further comprises a substrate.

9. The composition of claim 1, wherein the sulfur-containing compounds have an average molar ratio of thiol sulfur to sulfide sulfur in a range from 1.5:1 to 1000:1.

10. The composition of claim 1, wherein:
    the polythiol composition contains less than 0.5 wt. % 5-vinylnorborn-2-ene; and
    the sulfur-containing compounds comprise less than 0.5 wt mono-sulfur compounds.

11. The composition of claim 1, wherein:
    the polythiol composition contains less than 0.1 wt. % 5-vinylnorborn-2-ene; and
    the sulfur-containing compounds comprise less than 0.1 wt % mono-sulfur compounds.

12. The composition of claim 1, wherein the sulfur-containing compounds comprise from 70 wt. % to 90 wt. % 5-(2-mercaptoethyl)norbornane-2-thiol and/or 5-(2-mercaptoethyl)norbornane-3-thiol.

13. The composition of claim 1, wherein the sulfur-containing compounds are characterized by:
    an average of from 1.5 wt. % to 3 wt. % sulfide sulfur; and
    an average of from 27 wt. % to 33 wt. % thiol sulfur.

14. The composition of claim 1, wherein the sulfur-containing compounds have a weight ratio of 5-(2-mercaptoethyl)norbornane-2-thiol and 5-(2-mercaptoethyl)norbornane-3-thiol, in total, to intermolecular sulfide compounds in a range from 1:1 to 10:1.

15. The composition of claim 2, wherein the sulfur-containing compounds contain from 5 wt. % to 35 wt. % intermolecular sulfide compounds.

16. The composition of claim 2, wherein the sulfur-containing compounds contain from 10 wt. % to 30 wt. % intermolecular sulfide compounds.

17. The composition of claim 5, wherein the sulfur-containing compounds contain from 10 wt. % to 30 wt. % intermolecular sulfide compounds.

* * * * *

UNITED STATES PATENT AND TRADEMARK OFFICE
CERTIFICATE OF CORRECTION

PATENT NO. : 9,522,975 B2
APPLICATION NO. : 14/608782
DATED : December 20, 2016
INVENTOR(S) : Michael S. Matson et al.

Page 1 of 1

It is certified that error appears in the above-identified patent and that said Letters Patent is hereby corrected as shown below:

In the Claims

Column 32, Line 25: "wt mono-sulfur" should be replaced with -- wt. % mono-sulfur --

Column 32, Line 30: "wt % mono-sulfur" should be replaced with -- wt. % mono-sulfur --

Signed and Sealed this
Twenty-first Day of August, 2018

Andrei Iancu
*Director of the United States Patent and Trademark Office*